(12) United States Patent
Arsenault et al.

(10) Patent No.: US 7,926,078 B2
(45) Date of Patent: *Apr. 12, 2011

(54) VIRTUAL VIDEO ON DEMAND USING MULTIPLE ENCRYPTED VIDEO SEGMENTS

(75) Inventors: Robert G. Arsenault, Redondo Beach, CA (US); Leon J. Stanger, Farmington, UT (US)

(73) Assignee: The DIRECTV Group, Inc., El Segundo, CA (US)

( * ) Notice: Subject to any disclaimer, the term of this patent is extended or adjusted under 35 U.S.C. 154(b) by 1838 days.

This patent is subject to a terminal disclaimer.

(21) Appl. No.: 10/759,679

(22) Filed: Jan. 19, 2004

(65) Prior Publication Data

US 2004/0148634 A1 Jul. 29, 2004

Related U.S. Application Data

(63) Continuation of application No. 09/491,959, filed on Jan. 26, 2000, now Pat. No. 6,701,528.

(51) Int. Cl.
*H04N 7/173* (2006.01)
(52) U.S. Cl. .......... 725/89; 725/101; 725/134; 725/142
(58) Field of Classification Search .................. 725/89, 725/101, 134, 142
See application file for complete search history.

(56) References Cited

U.S. PATENT DOCUMENTS

| | | | |
|---|---|---|---|
| 4,605,961 A | 8/1986 | Frederiksen | |
| 4,613,901 A | 9/1986 | Gilhousen et al. | |
| 4,633,309 A | 12/1986 | Li et al. | |
| 4,675,732 A | 6/1987 | Oleson | |
| 4,694,490 A | 9/1987 | Harvey et al. | |
| 4,866,769 A | 9/1989 | Karp | |
| 4,866,787 A | 9/1989 | Olesen | |
| 5,033,084 A | 7/1991 | Beecher | |
| 5,132,992 A | 7/1992 | Yurt et al. | |
| 5,168,353 A | 12/1992 | Walker et al. | |
| 5,172,413 A | 12/1992 | Bradley et al. | |
| 5,199,066 A | 3/1993 | Logan | |
| 5,301,245 A | 4/1994 | Endoh | |
| 5,301,352 A | 4/1994 | Nakagawa et al. | |
| 5,357,276 A | 10/1994 | Banker et al. | |
| 5,371,551 A | 12/1994 | Logan et al. | |
| 5,386,587 A | 1/1995 | Yuzawa | |

(Continued)

FOREIGN PATENT DOCUMENTS

EP 0 936 812 A1 8/1999

(Continued)

OTHER PUBLICATIONS

Tsubakiyama, Hideki and Koga, Keiichiro; "Security for Information Data Broadcasting System with Conditional-Access Control"; IEEE; 1993; pp. 164-170.

(Continued)

*Primary Examiner* — Andrew Y Koenig
*Assistant Examiner* — Ricky Chin

(57) ABSTRACT

A method and apparatus for providing a virtual video on demand services is disclosed. The method and apparatus disclose the storing of a segment of the video program in advance for VOD viewing at a later time. When the subscriber selects VOD service, a pre-stored video segment is retrieved for presentation to the subscriber. Remaining video program segments simultaneously broadcast on a plurality of channels are recorded in parallel while the pre-stored video program segment is retrieved and presented to the user.

16 Claims, 13 Drawing Sheets

U.S. PATENT DOCUMENTS

| | | | |
|---|---|---|---|
| 5,396,293 A | 3/1995 | Shellard | |
| 5,421,031 A | 5/1995 | De Bey | |
| 5,438,423 A | 8/1995 | Lynch et al. | |
| 5,440,336 A | 8/1995 | Buhro et al. | |
| 5,495,531 A | 2/1996 | Smiedt | |
| 5,506,902 A | 4/1996 | Kubota | |
| 5,557,541 A | 9/1996 | Schulhof et al. | |
| 5,565,805 A | 10/1996 | Nakagawa | |
| 5,583,937 A | 12/1996 | Ullrich | |
| 5,586,264 A | 12/1996 | Belknap | |
| 5,590,200 A | 12/1996 | Nachman et al. | |
| 5,592,551 A | 1/1997 | Lett | |
| 5,592,651 A | 1/1997 | Rackman | |
| 5,594,491 A | 1/1997 | Hodge | |
| 5,619,247 A | 4/1997 | Russo | |
| 5,640,453 A | 6/1997 | Schuchman | |
| 5,642,418 A | 6/1997 | Farris | |
| 5,663,896 A | 9/1997 | Aucsmith | |
| 5,675,390 A | 10/1997 | Schindler | |
| 5,677,895 A | 10/1997 | Mankovitz | |
| 5,701,383 A | 12/1997 | Russo | |
| 5,701,582 A | 12/1997 | De Bey | |
| 5,710,970 A | 1/1998 | Walters | |
| 5,715,315 A | 2/1998 | Handelman | |
| 5,715,403 A | 2/1998 | Stefik | |
| 5,721,829 A | 2/1998 | Dunn | |
| 5,724,646 A | 3/1998 | Ganek | |
| 5,729,280 A | 3/1998 | Inome | |
| 5,734,853 A | 3/1998 | Hendricks et al. | |
| 5,748,732 A | 5/1998 | Le Berre | |
| 5,761,302 A | 6/1998 | Park | |
| 5,764,762 A | 6/1998 | Kazmierczak | |
| 5,784,095 A | 7/1998 | Robbins | |
| 5,790,663 A | 8/1998 | Lee | |
| 5,793,971 A | 8/1998 | Fujita | |
| 5,805,699 A | 9/1998 | Akiyama | |
| 5,826,165 A | 10/1998 | Echeita | |
| 5,831,664 A | 11/1998 | Wharton | |
| 5,845,240 A | 12/1998 | Fielder | |
| 5,850,218 A | 12/1998 | La Joie | |
| 5,864,747 A | 1/1999 | Clark | |
| 5,867,207 A | 2/1999 | Chaney | |
| 5,899,582 A | 5/1999 | DuLac | |
| 5,912,969 A | 6/1999 | Sasamoto | |
| 5,914,941 A | 6/1999 | Janky | |
| 5,926,205 A | 7/1999 | Krause | |
| 5,930,215 A | 7/1999 | Fite | |
| 5,930,802 A | 7/1999 | Lee | |
| 5,933,500 A | 8/1999 | Blatter | |
| 5,936,660 A | 8/1999 | Gurantz | |
| 5,937,067 A | 8/1999 | Thatcher | |
| 5,953,418 A | 9/1999 | Bock | |
| 5,966,186 A | 10/1999 | Shigihara | |
| 5,973,756 A | 10/1999 | Erlin | |
| 5,978,649 A | 11/1999 | Kahn | |
| 5,987,501 A | 11/1999 | Hamilton et al. | |
| 5,999,628 A | 12/1999 | Chan | |
| 5,999,629 A | 12/1999 | Heer | |
| 6,005,937 A | 12/1999 | Lee | |
| 6,011,511 A | 1/2000 | Chuong | |
| 6,025,868 A | 2/2000 | Russo | |
| 6,055,314 A | 4/2000 | Spies et al. | |
| 6,055,566 A | 4/2000 | Kikinis | |
| 6,061,451 A | 5/2000 | Muratani | |
| 6,061,452 A | 5/2000 | Suzuki | |
| 6,069,647 A | 5/2000 | Sullivan | |
| 6,072,873 A | 6/2000 | Bewick | |
| 6,072,982 A | 6/2000 | Haddad | |
| 6,075,330 A | 6/2000 | Terk | |
| 6,091,883 A * | 7/2000 | Artigalas et al. | 386/83 |
| 6,097,441 A | 8/2000 | Allport | |
| 6,105,134 A | 8/2000 | Pinder et al. | |
| 6,144,400 A | 11/2000 | Ebisawa | |
| 6,148,081 A | 11/2000 | Szymanski et al. | |
| 6,157,719 A | 12/2000 | Wasilewski | |
| 6,157,949 A | 12/2000 | Cheng | |
| 6,169,879 B1 | 1/2001 | Perlman | |
| 6,202,211 B1 | 3/2001 | Williams, Jr. | |
| 6,229,895 B1 | 5/2001 | Son | |
| 6,240,401 B1 | 5/2001 | Oren | |
| 6,263,504 B1 | 7/2001 | Ebisawa | |
| 6,266,481 B1 | 7/2001 | Lee | |
| 6,286,142 B1 | 9/2001 | Ehreth | |
| 6,288,716 B1 | 9/2001 | Humpleman | |
| 6,289,455 B1 | 9/2001 | Kocher | |
| 6,317,883 B2 | 11/2001 | Marics | |
| 6,317,884 B1 | 11/2001 | Eames | |
| 6,370,688 B1 | 4/2002 | Hejna, Jr. | |
| 6,381,747 B1 | 4/2002 | Wonfor et al. | |
| 6,385,596 B1 | 5/2002 | Wiser et al. | |
| 6,398,245 B1 | 6/2002 | Gruse | |
| 6,415,031 B1 | 7/2002 | Colligan | |
| 6,437,836 B1 | 8/2002 | Huang | |
| 6,456,985 B1 | 9/2002 | Ohtsuka | |
| 6,466,671 B1 | 10/2002 | Maillard | |
| 6,466,921 B1 | 10/2002 | Cordery | |
| 6,473,858 B1 | 10/2002 | Shimomura | |
| 6,480,667 B1 | 11/2002 | O'Connor | |
| 6,487,663 B1 | 11/2002 | Jaisimha | |
| 6,487,722 B1 | 11/2002 | Okura | |
| 6,496,980 B1 | 12/2002 | Tillman | |
| 6,502,139 B1 | 12/2002 | Birk | |
| 6,510,519 B2 | 1/2003 | Wasilewski et al. | |
| 6,516,412 B2 | 2/2003 | Wasilewski | |
| 6,516,465 B1 | 2/2003 | Paskins | |
| 6,519,693 B1 | 2/2003 | De Bey | |
| 6,519,772 B1 | 2/2003 | Bopardikar | |
| 6,523,114 B1 | 2/2003 | Barton | |
| 6,530,085 B1 | 3/2003 | Perlman | |
| 6,542,870 B1 | 4/2003 | Matsumoto | |
| 6,543,053 B1 | 4/2003 | Li et al. | |
| 6,550,011 B1 | 4/2003 | Sims, III | |
| 6,560,340 B1 | 5/2003 | Akins et al. | |
| 6,574,609 B1 | 6/2003 | Downs | |
| 6,611,812 B2 | 8/2003 | Hurtado | |
| 6,654,547 B1 | 11/2003 | Maeda | |
| 6,655,580 B1 | 12/2003 | Ergo | |
| 6,681,326 B2 | 1/2004 | Son et al. | |
| 6,714,650 B1 | 3/2004 | Maillard et al. | |
| 6,748,080 B2 | 6/2004 | Russ et al. | |
| 6,851,055 B1 | 2/2005 | Boyle et al. | |
| 6,853,728 B1 | 2/2005 | Kahn et al. | |
| 6,868,452 B1 | 3/2005 | Eager et al. | |
| 6,889,208 B1 | 5/2005 | Okabe et al. | |
| 6,912,513 B1 | 6/2005 | Candelore | |
| 6,934,963 B1 * | 8/2005 | Reynolds et al. | 725/39 |
| 6,961,858 B2 | 11/2005 | Fransdonk | |
| 6,987,854 B2 | 1/2006 | Maillard | |
| 6,993,499 B2 | 1/2006 | Gagnon et al. | |
| 7,035,827 B2 | 4/2006 | Ezaki | |
| 7,089,579 B1 | 8/2006 | Mao et al. | |
| 7,096,271 B1 | 8/2006 | Omoigui et al. | |
| 7,191,155 B2 | 3/2007 | Maruyama et al. | |
| 7,191,335 B1 | 3/2007 | Maillard | |
| 7,240,359 B1 * | 7/2007 | Sie et al. | 725/88 |
| 7,370,342 B2 | 5/2008 | Ismail et al. | |
| 7,549,058 B1 | 6/2009 | Wang et al. | |
| 2001/0001876 A1 | 5/2001 | Morgan et al. | |
| 2001/0017920 A1 | 8/2001 | Son et al. | |
| 2002/0001386 A1 | 1/2002 | Akiyama | |
| 2002/0023219 A1 | 2/2002 | Treffers et al. | |
| 2002/0040475 A1 | 4/2002 | Yap et al. | |
| 2002/0056112 A1 | 5/2002 | Dureau et al. | |
| 2002/0083438 A1 | 6/2002 | So et al. | |
| 2002/0112243 A1 | 8/2002 | Hunter et al. | |
| 2002/0166121 A1 | 11/2002 | Rovira | |
| 2002/0170054 A1 | 11/2002 | Kudelski et al. | |
| 2002/0184628 A1 | 12/2002 | Kim et al. | |
| 2003/0005285 A1 | 1/2003 | Graunke | |
| 2003/0018980 A1 | 1/2003 | Gorbatov et al. | |
| 2003/0037006 A1 | 2/2003 | Maruyama et al. | |
| 2003/0040962 A1 | 2/2003 | Lewis et al. | |
| 2003/0061477 A1 | 3/2003 | Kahn et al. | |
| 2003/0110132 A1 | 6/2003 | Sako | |
| 2003/0131349 A1 | 7/2003 | Kuczynski-Brown | |
| 2003/0145183 A1 | 7/2003 | Muehring et al. | |
| 2003/0174844 A1 | 9/2003 | Candelore | |

| | | |
|---|---|---|
| 2003/0177365 A1 | 9/2003 | Buhan et al. |
| 2003/0228911 A1 | 12/2003 | Dernis et al. |
| 2004/0032950 A1 | 2/2004 | Graunke |
| 2004/0068721 A1 | 4/2004 | O'Neill et al. |
| 2004/0073954 A1 | 4/2004 | Bjordammen et al. |
| 2004/0190721 A1 | 9/2004 | Barrett et al. |
| 2005/0050333 A1 | 3/2005 | Yeap et al. |
| 2005/0144468 A1 | 6/2005 | Northcutt et al. |
| 2005/0169468 A1 | 8/2005 | Fahrny et al. |
| 2005/0182931 A1 | 8/2005 | Robert et al. |
| 2005/0183112 A1 | 8/2005 | Duval |
| 2005/0216942 A1 | 9/2005 | Barton |
| 2005/0235361 A1 | 10/2005 | Alkove et al. |
| 2006/0126833 A1 | 6/2006 | O'Leary et al. |
| 2006/0168663 A1 | 7/2006 | Viljoen et al. |
| 2006/0179489 A1 | 8/2006 | Mas Ribes |
| 2006/0212928 A1 | 9/2006 | Maino et al. |
| 2006/0218620 A1 | 9/2006 | Nadarajah et al. |
| 2007/0009235 A1 | 1/2007 | Walters et al. |
| 2007/0058924 A1 | 3/2007 | Yeh |
| 2007/0118606 A1 | 5/2007 | Duncan et al. |
| 2007/0219918 A1 | 9/2007 | Schull |
| 2007/0245010 A1 | 10/2007 | Arn et al. |
| 2007/0294422 A1 | 12/2007 | Zuckerman et al. |
| 2008/0019529 A1 | 1/2008 | Kahn et al. |
| 2008/0168523 A1 | 7/2008 | Ansari et al. |
| 2008/0172593 A1 | 7/2008 | Rainish et al. |
| 2008/0288998 A1 | 11/2008 | Locket et al. |
| 2009/0080653 A1 | 3/2009 | Candelore et al. |
| 2009/0106802 A1 | 4/2009 | Zuckerman et al. |
| 2010/0027550 A1 | 2/2010 | Candelore et al. |

FOREIGN PATENT DOCUMENTS

| | | |
|---|---|---|
| EP | 0 975 165 A2 | 1/2000 |
| EP | 0 989 557 A1 | 3/2000 |
| EP | 1 156 676 A2 | 11/2001 |
| EP | 1 304 871 A2 | 4/2003 |
| EP | 1 369 152 A2 | 12/2003 |
| JP | 06351023 A | 12/1994 |
| JP | 11136708 A | 5/1999 |
| WO | WO 92/11713 | 7/1992 |
| WO | WO 99/18729 | 4/1999 |
| WO | WO 00/13412 | 3/2000 |
| WO | WO 00/19294 | 4/2000 |
| WO | WO 01 43444 A2 | 6/2001 |
| WO | WO 01/98920 | 12/2001 |
| WO | WO 02/15184 A1 | 2/2002 |
| WO | WO 02/065750 A2 | 8/2002 |
| WO | WO 03/103293 | 12/2003 |

OTHER PUBLICATIONS

EBU Project Group B/CA; "Functional Model of a Conditional Access System"; EBU Technical Review; Jun. 10, 1995; pp. 64-77.
U.S. Appl. No. 10/758,865, Jan. 16, 2004, Raynold M. Kahn, Non-final Office action dated Sep. 25, 2007.
U.S. Appl. No. 10/758,818, Jan. 16, 2004, Raynold M. Kahn, Final Rejection dated Aug. 20, 2007.
U.S. Appl. No. 10/790,466, Mar. 1, 2004, Stephen P. Dulac, Final Rejection dated Oct. 10, 2007.
"PKCS #1 v2.1: RSA Cryptography Standard"; Jun. 14, 2002; RSA Laboratories; 61 pages.
Ma, Huadong; Shin, Kang G.; "Multicast Video on Demand Services"; ACM SIGCOMM Computer Communication Review; vol. 32, Issue 1; Jan. 2002; pp. 31-43; ACM Press; New York, NY, USA.
Tantaoui et al.; "Interaction with Broadcast Video"; International Multimedia Conference Proceedings of the 10th ACM International Conference on Multimedia; pp. 29-38; ACM Press; New York, NY, USA; 2002; ISBN: 1-58113-620-X.
Griwodz et al.; "Protecting Vo D The Easier Way"; International Multimedia Conference Proceedings of the 6th ACM International Conference on Multimedia; pp. 21-28; ACM Press; New York, NY, USA; 2002; ISBN: 0-201-30990-4.
Rangan, P. Venkat, et al., "Designing an On-Demand Multimedia Service", IEEE Communications Magazine, Jul. 1992, vol. 30, No. 7, title page and pp. 56-64.
Liao, Wanjiun, et al., "The Split and Merge Protocol for Inter-active Video-On-Demand", IEEE MultiMedia, Oct.-Dec. 1997, vol. 4, No. 4, index and pp. 51-62.
Johnston, Robert, et al., "A Digital Television Sequence Store", IEEE Transactions on Communications, May 1978, vol. COM-26, No. 5, index and pp. 594-600.
"Proposed SMPTE Standard for Television-Splice Points for MPEG-2 Transport Streams", SMPTE Journal, Oct. 1998, SMPTE 312M, pp. 916-925.
Robin, Michael, et al., "Digital Television Fundamentals-Design and Installation of Video and Audio Systems", McGraw-Hill, Chapter 8, title page(s) and pp. 345-425.
Li, Yongchen, et al., "Security Enhanced MPEG Player", IEEE, 1996, pp. 169-175.
Fink, Ready to take the dive? It's fast-forward as new DVD and Divx formats hit market (includes graphic: Home video: the next generation plus: Some selections . . . York Daily Record, December.
Lee, Sin-Joo, et al., "A Survey of Watermarking Techniques Applied to Multimedia", IEEE, 2001, pp. 272-277.
"PocketTV Brings Video to Palm-size PC", Mar. 9, 2000, 2 pages.
1st Report of EBU/SMPTE Task Force for Harmonized Standards for the Exchange of Television Program Material as Bit Streams, May 1997, Version 1.30, pp. 1-73.
Schneier, B, "Applied Cryptography-Protocols, Algorithms, and Source Code in C", 2nd Edition, pp. 216-222, 357-362.
HP Jornada 430/430se Palm-size PC: User's Guide, Hewlett Packard, 1999, pp. 7-9.
PocketTV-MPEG movie player for Pocket PC and WinCE, May 17, 2000, MPEG TV, LLC, retrieved from URL: http://web.archive.org/web/200006210123803/www.mpegtv.com/wince/pockettv/index.html.
Download PockeTV (beta) for WinCE, Nov. 3, 1999, MPEG TV, LLC, retrieved from URL: http://web.archive.org/web/19991127093158/www.mpegtv.com/wince/pockettv/index.html.
Anerousis, N., "SkyCast: The Satellite Digital Broadcast Relay Service", AT&T Labs Research, unpublished manuscript, 1999, pp. 1-4.
"PKCS#1 v2.1: RSA Cryptography Standard"; Jun. 14, 2002; RSA Laboratories; 61 pages.
Notice of Allowance dated Dec. 10, 2007 in U.S. Appl. No. 09/960,824, filed Sep. 21, 2001 by Kahn et al.
Non-final Office Action dated Dec. 4, 2007 in U.S. Appl. No. 10/758,811, filed Jan. 16, 2004 by Kahn et al.
Final Office Action dated Jan. 23, 2008 in U.S. Appl. No. 09/620,772, filed Jul. 21, 2000 by Kahn et al.
Advisory Action dated Jan. 7, 2008 in U.S. Appl. No. 10/790,466, filed Mar. 1, 2004 by Dulac, Stephen P.
Non-final Office Action dated May 23, 2008 in U.S. Appl. No. 10/790,466, filed Mar. 1, 2004 by Stephen P. Dulac.
EPO Communication dated Dec. 9, 2008 in European patent Application No. 05251218.3 filed Mar. 1, 2005 by Stephen P. Dulac.
Non-final Office Action dated Sep. 1, 2009 in U.S. Appl. No. 10/790,466, filed Mar. 1, 2004 by Stephen P. Dulac.
Notice of Allowance dated Mar. 23, 2010 in U.S. Appl. No. 10/790,466, filed Mar. 1, 2004 by Stephen P. Dulac.

* cited by examiner

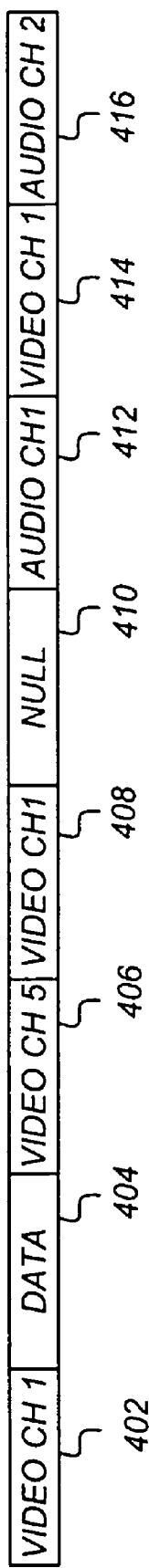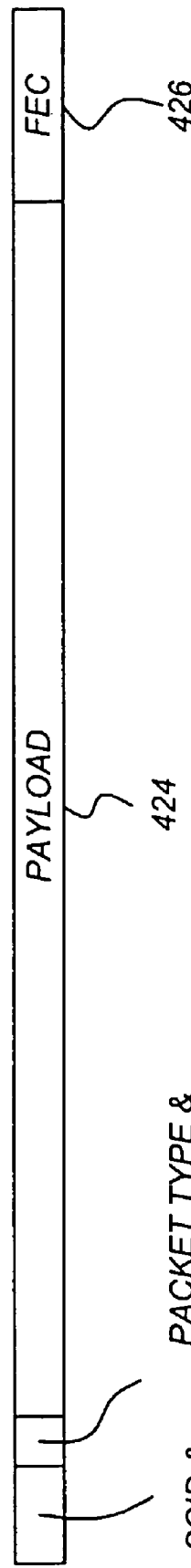
FIG. 4A
FIG. 4B

VIRTUAL VIDEO ON DEMAND USING MULTIPLE ENCRYPTED VIDEO SEGMENTS

CROSS REFERENCE TO RELATED APPLICATIONS

This application is a continuation of application Ser. No. 09/491,959, entitled "VIRTUAL VIDEO ON DEMAND USING MULTIPLE ENCRYPTED VIDEO SEGMENTS", filed Jan. 26, 2000, by Robert G. Arsenault et al., now issued Mar. 2, 2004 as U.S. Pat. No. 6,701,528.

This application is also related to the following applications:

application Ser. No. 09/590,417, entitled "METHOD AND APPARATUS FOR TRANSMITTING, RECEIVING, AND UTILIZING AUDIO/VISUAL SIGNALS AND OTHER INFORMATION", filed Jun. 8, 2000, by Arthur Tilford;

application Ser. No. 09/620,772, entitled "SUPER ENCRYPTED STORAGE AND RETRIEVAL OF MEDIA PROGRAMS WITH SMARTCARD GENERATED KEYS", filed Jul. 21, 2000, by Raynold M. Kahn et al., which application is hereby incorporated by reference herein;

application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY", filed Jul. 21, 2000, by Raynold M. Kahn et al., now issued Apr. 10, 2007 as U.S. Pat. No. 7,203,314, which application is hereby incorporated by reference herein;

application Ser. No. 09/620,832, entitled "VIDEO ON DEMAND PAY PER VIEW SERVICES WITH UNMODIFIED CONDITIONAL ACCESS FUNCTIONALITY", filed Jul. 21, 2000, by Raynold M. Kahn et al., now issued Feb. 8, 2005 as U.S. Pat. No. 6,853,728, which application is hereby incorporated by reference herein;

application Ser. No. 09/960,824 entitled "METHOD AND APPARATUS FOR ENCRYPTING MEDIA PROGRAMS FOR LATER PURCHASE AND VIEWING", filed Sep. 21, 2001, by Raynold M. Kahn et al.;

application Ser. No. 10/490,261 entitled "METHOD AND APPARATUS FOR CONTROLLING PAIRED OPERATION OF A CONDITIONAL ACCESS MODULE AND AN INTEGRATED RECEIVER AND DECODER", filed Aug. 5, 2004, by Raynold M. Kahn et al., which is a national stage entry of PCT/US02/29881 filed Sep. 20, 2002;

application Ser. No. 10/758,811 entitled "DISTRIBUTION OF VIDEO CONTENT USING A TRUSTED NETWORK KEY FOR SHARING CONTENT", filed Jan. 16, 2004, by Raynold M. Kahn et al;

application Ser. No. 10/758,818 entitled "DISTRIBUTION OF BROADCAST CONTENT FOR REMOTE DECRYPTION AND VIEWING", filed Jan. 16, 2004, by Raynold M. Kahn et al;

application Ser. No. 10/758,865 entitled "DISTRIBUTION OF VIDEO CONTENT USING CLIENT TO HOST PAIRING OF INTEGRATED RECEIVERS/DECODERS", filed Jan. 16, 2004, by Raynold M. Kahn et al;

application Ser. No. 10/790,466 entitled "VIDEO ON DEMAND IN A BROADCAST NETWORK", filed Mar. 1, 2004, by Stephen P. Dulac;

application Ser. No. 11/433,926 entitled "METHODS AND APPARATUS TO PROTECT CONTENT IN HOME NETWORKS", filed May 15, 2006, by Raynold M. Kahn;

application Ser. No. 11/433,969 entitled "METHODS AND APPARATUS TO PROVIDE CONTENT ON DEMAND IN CONTENT BROADCAST SYSTEMS", filed May 15, 2006, by Peter M. Klauss et al.;

application Ser. No. 11/434,082 entitled "CONTENT DELIVERY SYSTEMS AND METHODS TO OPERATE THE SAME", filed May 15, 2006, by Raynold M. Kahn et al.;

application Ser. No. 11/434,404 entitled "SECURE CONTENT TRANSFER SYSTEMS AND METHODS TO OPERATE THE SAME", filed May 15, 2006, by Raynold M. Kahn et al;

application Ser. No. 11/434,437 entitled "METHODS AND APPARATUS TO CONDITIONALLY AUTHORIZE CONTENT DELIVERY AT RECEIVERS IN PAY DELIVERY SYSTEMS", filed May 15, 2006, by Raynold M. Kahn et al.;

application Ser. No. 11/434,528 entitled "METHODS AND APPARATUS TO CONDITIONALLY AUTHORIZE CONTENT DELIVERY AT BROADCAST HEADENDS IN PAY DELIVERY SYSTEMS", filed May 15, 2006, by Raynold M. Kahn et al.;

application Ser. No. 11/434,538 entitled "METHODS AND APPARATUS TO CONDITIONALLY AUTHORIZE CONTENT DELIVERY AT CONTENT SERVERS IN PAY DELIVERY SYSTEMS", filed May 15, 2006, by Raynold M. Kahn et al.;

application Ser. No. 11/499,635 entitled "DISTRIBUTED MEDIA-PROTECTION SYSTEMS AND METHODS TO OPERATE THE SAME", filed Aug. 4, 2006, by Michael Ficco;

application Ser. No. 11/499,636 entitled "DISTRIBUTED MEDIA-AGGREGATION SYSTEMS AND METHODS TO OPERATE THE SAME", filed Aug. 4, 2006, by Michael Ficco;

application Ser. No. 11/501,985 entitled "SECURE DELIVERY OF PROGRAM CONTENT VIA A REMOVAL STORAGE MEDIUM", filed Aug. 10, 2006, by Raynold M. Kahn et al.;

application Ser. No. 11/654,752 entitled "SECURE STORAGE AND REPLAY OF MEDIA PROGRAMS USING A HARD-PAIRED RECEIVER AND STORAGE DEVICE", filed Jan. 18, 2007, by Raynold M. Kahn et al., which is a continuation of application Ser. No. 09/620,833, entitled "SECURE STORAGE AND REPLAY OF MEDIA PROGRAMS USING A HARD-PAIRED RECEIVER AND STORAGE DEVICE", filed Jul. 21, 2000, by Raynold M. Kahn et al., which application is hereby incorporated by reference; and application Ser. No. 11/701,800 entitled "SUPER ENCRYPTED STORAGE AND RETRIEVAL OF MEDIA PROGRAMS IN A HARD-PAIRED RECEIVER AND STORAGE DEVICE", filed Feb. 2, 2007, by Raynold M. Kahn et al., which is a continuation of application Ser. No. 09/621,476, entitled "SUPER ENCRYPTED STORAGE AND RETRIEVAL OF MEDIA PROGRAMS IN A HARD-PAIRED RECEIVER AND STORAGE DEVICE" filed Jul. 21, 2000, by Raynold M. Kahn et al., now issued Apr. 10, 2007 as U.S. Pat. No. 7,203,311.

BACKGROUND OF THE INVENTION

1. Field of the Invention

The present invention relates to systems and methods for providing video program material to subscribers, and in particular to a method and system for providing near video on demand services.

2. Description of the Related Art

In recent years, there has been increasing interest in providing video-on-demand (VOD) services to cable and satellite television subscribers. With an idealized VOD system, the user simply selects the desired program material (video or audio), transmits the selection to the video provider, and the video program is transmitted to the user in a real time data stream. With such idealized systems, the user can control the display of the video program in real time by issuing stop, rewind, fast-forward, or pause commands. These commands are received by the video server, and the data stream is interrupted or modified as appropriate for the command from the viewer. Essentially, this VOD paradigm implements a client-server architecture wherein the user's set top box (or computer) is the client, and the video server is the server.

While the foregoing VOD system would provide the user with beneficial and flexible service, it suffers from several major disadvantages. First, it places tremendous difficulties on the input/output (I/O) multiplexing and bandwidth capabilities of the video server. While the real-time transmission of a single video program to a single video subscriber is relatively easy to accomplish, this is not the case when a wide variety of different video sources may be requested by a large number of video subscribers all at the same time. Essentially, because subscriber requests are generally asynchronous, each request for a particular video program requires a separate transmission, and each separate transmission consumes a portion of the available bandwidth.

Second, the foregoing systems are intolerant of communication latencies between the user and the video server. Particularly when fast-forwarding and rewinding through video sequences to look for segments of interest, users may issue a number of commands in rapid succession, expecting near instantaneous responses from the video server. Even minor communication latencies can become an extreme irritation to the user.

Many different solutions to these problems have been proposed, but for the most part, these solutions have had limited success. For the most part, these solutions are unnecessarily complicated and expensive because they focus on streamlining the data transmission process with the use of higher capability equipment, or a plurality of remotely located video servers.

What is needed is a method for supplying video on demand to a large number of subscribers, each of which may request a different program and at times asynchronous to one another. The present invention satisfies that need.

SUMMARY OF THE INVENTION

In summary, the present invention describes a system and method in which an integrated receiver/decoder (IRD) or similar device is used to select and store programs to support video on demand. In one embodiment, programs are selected by use of a broadcaster-controlled attribute, such as a flag in a program guide. In another embodiment, this is accomplished by a customer setup profile (e.g. programs with DOLBY digital or programs of a specific genre). The IRD scans the program guide to identify VOD candidates, and based on the start times in the program guides and transport streams, then schedules the pre-recording of segments of the identified programs.

The scheduled pre-recording of segments of the identified programs can occur at a rate that is faster than real time. To accomplish this, the IRD scans the program guide and learns the start time for each of the NVOD candidates. When multiple staggered program start times are found, the IRD determines which portions of the program can be received and stored in parallel in order to pre-record all relevant program segments in the shortest time. IRDs with single tuners acquire staggered start times that are on the same transport stream, while multi-tuner IRDs can collect data from many transport streams. After the storage process is complete, the customer is informed (for example, by the program guide), that the video program is available for VOD playback.

Once the user demands VOD playback, the pre-stored video segment is played back to the user, while the remaining subsequent segments of the video program are received and recorded in parallel. These subsequent segments are spliced to the pre-stored segment and to each other to give the appearance of VOD playback. In one embodiment, the IRD acquires and stores a purchase information packet (PIP) for each program segment. Further, where program is stored as multiple segments, MPEG data embedded in the SMPTE time code or the presentation time stamp information allows the IRD to perform MPEG on line editing to reassemble the program into a single filestream. The timecode information also allows the IRD to acquire and store a video program without interruption. The SMPTE timecode also allows the IRD to store a video program with user interruptions. When the IRD is in the process of storing video information to a disk and the customer uses the IRD to view a different program, the IRD can later resume acquisition using a later rebroadcast of the same program to resume the storage at the point before it was interrupted by the user.

In one embodiment, the time-staggered versions of selected (e.g. PPV) video programs are transmitted on channels that are broadcast on a common transponder. This allows a single-tuner IRD to acquire and store several program segments in parallel, resulting in faster than real time storage of the subsequent segments of video program while the customer is viewing the pre-stored program segment. So configured, the IRD can receive and store a video program 2-5 times faster than real time. This allows the user to fast-forward anywhere in the program within a single rebroadcast interval.

Decryption of the pre-stored program segments and the subsequent program segments is also be performed by the IRD. Since program segments are pre-stored by the IRD in anticipation of customer demand and the storage of the pre-stored segments may be autonomously performed by the IRD, the broadcaster may not be aware of which program segments were stored by each customer's IRD. In one embodiment, the IRD solves this problem by storing conditional access information such as a purchase information parcel (PIP) with each stored program segment. When the user makes a VOD demand, a message is sent from the IRD identifying each of the subsequent segments of the video program. In response, the IRD receives the PIPs corresponding to the subsequent program segments, and decodes, and splices them together as required. To prevent the customer from being billed for multiple viewing of the same program, a modified billing system recognizes that the program segments sent to the customer's IRD were part of a VOD program, and would bill the customer for a single viewing of all of the video segments. In one embodiment, separate PIPs for VOD service are defined, each of which having a value which is an appropriate (e.g. pro-rated according to the time length of the segment) fraction of the total charge for the complete program defined. In another embodiment, the billing system recognizes the PIPs as associated with program segments which were broadcast simultaneously, and adjusts the bill for a single viewing accordingly.

One embodiment of the present invention is described as a method comprising the steps of selecting at least one of a plurality of video programs for VOD service; receiving and storing a first segment of the selected video program in a local storage device before accepting a user demand to view the selected video program, wherein the temporal length of the first segment is at least substantially equivalent to a retransmission interval; and, after accepting the user demand to view the selected video program, retrieving the stored first segment for presentation while receiving and storing subsequent segments of the video program from each of the plurality of channels transmitting a portion of the selected video program in parallel.

One embodiment of the present invention is described by a method of storing or viewing a video program in response to a user demand, wherein the video program is repeatedly transmitted on one of a plurality of channels, each repeated transmission separated in time from a preceding transmission of the video program by a retransmission interval and being transmitted on a different channel than the previous transmission. The method comprises the steps of selecting at least one of a plurality of video programs, and receiving a plurality of time segments of the selected video program in parallel, wherein each of the time segments is received on a different one of the channels.

Another embodiment of the present invention is described by an apparatus comprising an input device for accepting a selection of at least one of a plurality of video programs for VOD service; a tuner for receiving multiple segments of the selected video program in parallel, wherein each segment is received on one of a plurality of channels; and a storage device, for pre-storing a first segment of the selected video program and for storing subsequent segments of the selected video program in parallel while retrieving the pre-stored first segment of the selected video program.

BRIEF DESCRIPTION OF THE DRAWINGS

Referring now to the drawings in which like reference numbers represent corresponding parts throughout:

FIG. 4A is a diagram of a representative data stream received from a satellite;

FIG. 4B is a diagram illustrating the structure of a data packet;

DETAILED DESCRIPTION OF PREFERRED EMBODIMENTS

In the following description, reference is made to the accompanying drawings which form a part hereof, and which-show, by way of illustration, several embodiments of the present invention. It is understood that other embodiments may be utilized and structural changes may be made without departing from the scope of the present invention.

Figure 1:
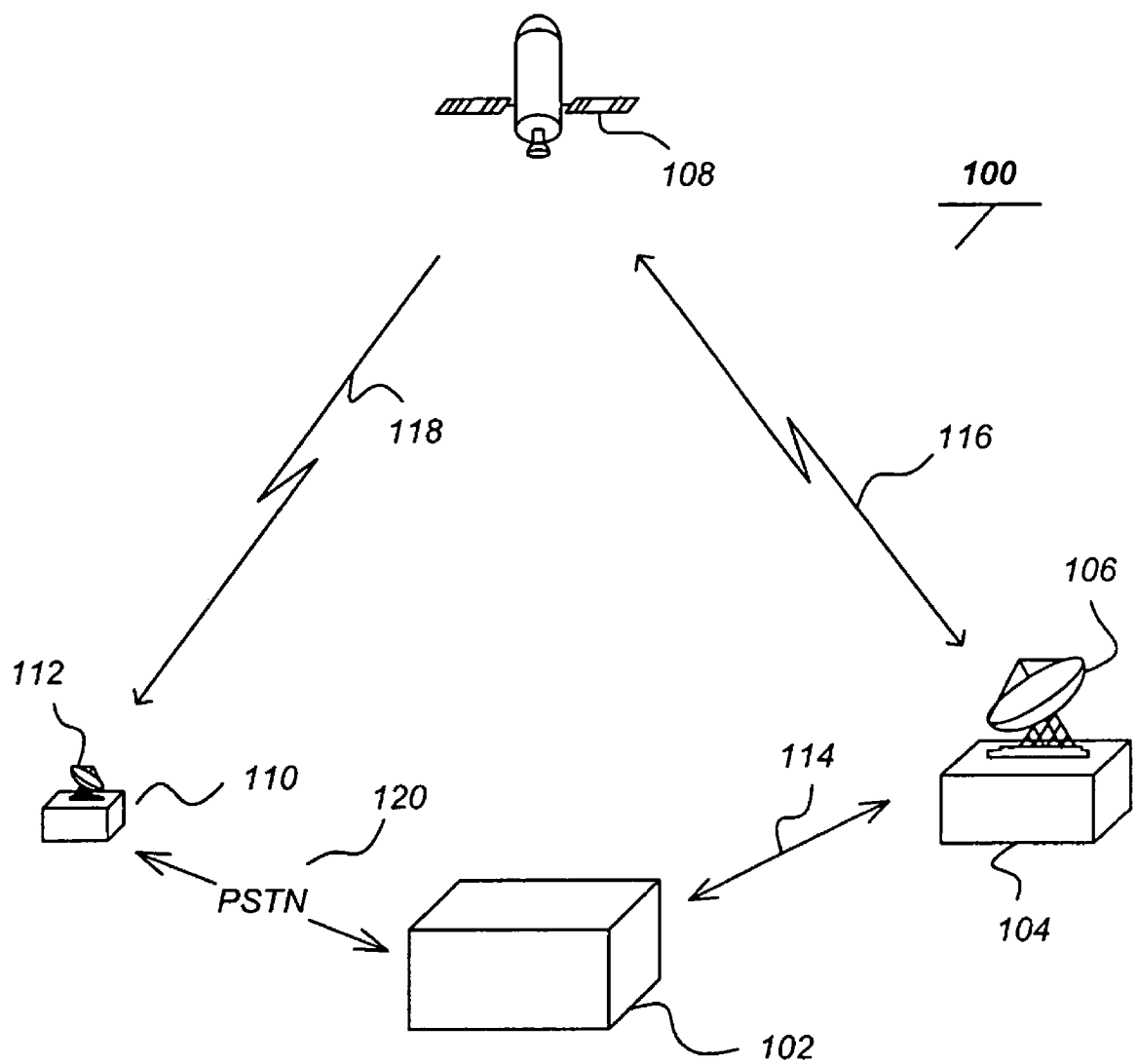
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground link 114 and with a subscriber 110 via a public switched telephone network (PSTN) or other link 120. The control center 102 provides program material to the uplink center 104, coordinates with the subscribers 110 to offer pay-per-view (PPV) program services, including billing and associated decryption of video programs.

The uplink center receives program material and program control information from the control center 102, and using an uplink antenna 106, transmits the program material and program control information to the satellite 108. The satellite receives and processes this information, and transmits the video programs and control information to the subscriber via downlink 118. The subscriber 110 receives this information using the subscriber antenna 112.

In one embodiment, the subscriber antenna 112 is an 18-inch slightly oval-shaped Ku-band antenna. The slight oval shape is due to the 22.5 degree offset feed of the LNB (low noise block converter) which is used to receive signals reflected from the subscriber antenna 112. The offset feed positions the LNB out of the way so it does not block any surface area of the antenna 112 minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information as well.

Figure 2:
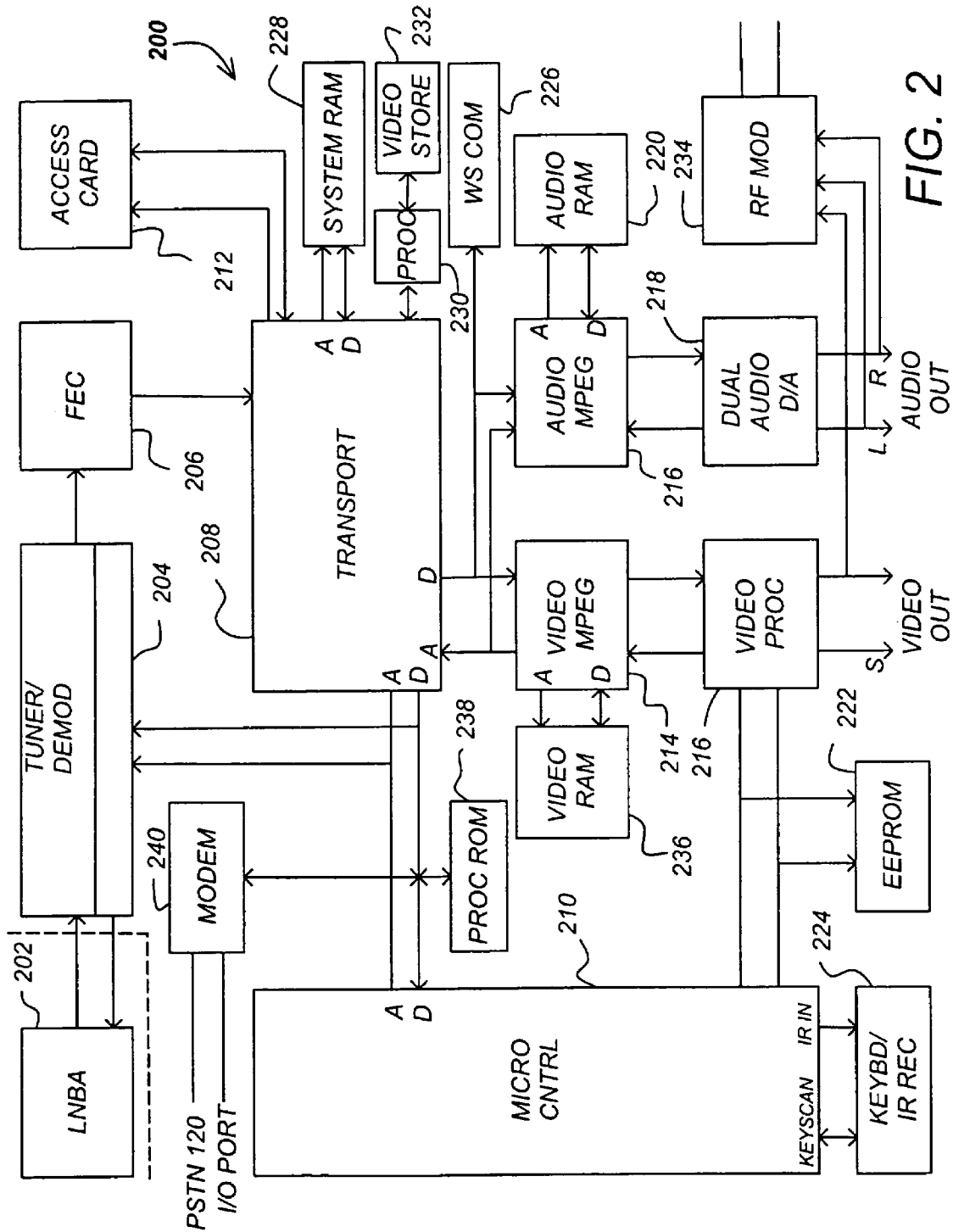
FIG. 2 is a block diagram of an integrated receiver/decoder for practicing the present invention.

FIG. 2 is a block diagram of an integrated receiver/decoder (IRD) 200 (also hereinafter alternatively referred to as receiver 200). The receiver 200 comprises a tuner/demodulator 204 communicatively coupled to the LNB 202. The LNB 202 converts the 12.2- to 12.7 GHz downlink 118 signal from the satellites 108 to, e.g., a 950-1450 MHz signal required by the receiver's 200 tuner/demodulator 204. The LNB 202 may provide either a dual or a single output. The single-output LNB 202 has only one RF connector, while the dual output LNB 202 has two RF output connectors and can be used to feed a second receiver or some other form of distribution system.

The tuner/demodulator 204 isolates a single, digitally modulated 24 MHz transponder, and converts the modulated data to a digital data stream. The digital data stream is then supplied to a forward error correction (FEC) decoder 206. This allows the receiver 200 to reassemble the data transmitted by the uplink center 104 (which applied the forward error correction to the desired signal before transmission to the subscriber 110) verify that the correct data signal was received, and correct errors, if any. The error-corrected data may be fed from the FEC decoder module 206 to the transport module via an 8-bit parallel interface.

The transport module 208 performs many of the data processing functions performed by the receiver 200. The transport module 208 processes data received from the FEC decoder module 206 and provides the processed data to the video MPEG decoder 214 and the audio MPEG decoder 216. In one embodiment of the present invention, the transport module, video MPEG decoder and audio MPEG decoder are all implemented on integrated circuits. This design promotes both space and power efficiency, and increases the security of the functions performed within the transport module 208. The transport module 208 also provides a passage for communications between the microcontroller 210 and the video and audio MPEG decoders 214, 216. As set forth more fully hereinafter, the transport module also works with the access card 212 to determine whether the subscriber 110 is permitted to access certain program material. Data from the transport module can also be supplied to external communication module 226. The operations performed by the transport module are further illustrated and described with respect to FIG. 3.

The access card 212 functions in association with other elements to decode an encrypted signal from the transport module 208. The access card 212 may also be used for tracking and billing these services. In one embodiment of the present invention, the access card is a smart card, having contacts cooperatively interacting with contacts in the receiver 200 to pass information. In order to implement the processing performed in the access card 212, the receiver 200, and specifically the transport module 208 provides a clock signal to the access card 212.

Video data is processed by the MPEG video decoder 214. Using the video random access memory (RAM) 236, the MPEG video decoder 214 decodes the compressed video data and sends it to an encoder or video processor 216, which converts the digital video information received from the video MPEG module 214 into an output signal usable by a display or other output device. By way of example, processor 216 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if ATSC high definition programming is processed.

Audio data is likewise decoded by the MPEG audio decoder 216. The decoded audio data may then be sent to a digital to analog (D/A) converter 218. In one embodiment of the present invention, the D/A converter 218 is a dual D/A converter, one for the right and left channels. If desired, additional channels can be added for use in surround sound processing or secondary audio programs (SAPs). In one embodiment of the invention, the dual D/A converter 218 itself separates the left and right channel information, as well as any additional channel information. Other audio formats may similarly be supported. For example multi-channel digital audio formats, such as DOLBY DIGITAL AC-3.

A description of the processes performed in the encoding and decoding of video streams, particularly with respect to MPEG and JPEG encoding/decoding, can be found in Chapter 8 of "Digital Television Fundamentals, by Michael Robin and Michel Poulin, McGraw-Hill, 1998, which is hereby incorporated by reference herein.

Microcontroller 210 receives and processes command signals from the remote control 224, a receiver 200 keyboard interface, and/or another input device. The microcontroller receives commands for performing its operations from a processor programming memory, which permanently stores such instructions for performing such commands. The processor programming memory may comprise a read only memory (ROM) 238, an electrically erasable programmable read only memory (EEPROM) or, similar memory device. The microcontroller 210 also controls the other digital devices of the receiver 200 via address and data lines (denoted "A" and "D" respectively, in FIG. 2).

The modem 240 connects to the customer's phone line via the PSTN port 120. It calls e.g. the program provider and transmits the customer's program purchases for billing purposes, and/or other information. The modem 240 is controlled by the microprocessor 210. The modem 240 can output data to other I/O port types including standard parallel and serial computer I/O ports.

The present invention also comprises a local storage unit such as the video storage device 232 for storing video and/or audio data obtained from the transport module 208. Video storage device 232 can be a hard disk drive, a read/writable compact disc of DVD, a solid state RAM, or any other storage medium. In one embodiment of the present invention, the video storage device 232 is a hard disk drive with specialized parallel read/write capability so that data may be read from the video storage device 232 and written to the device 232 at the same time. To accomplish this feat, additional buffer memory accessible by the video storage 232 or its controller may be used. Optionally, a video storage processor 230 can be used to manage the storage and retrieval of the video data from the video storage device 232. The video storage processor 230 may also comprise memory for buffering data passing into and out of the video storage device 232. Alternatively or in combination with the foregoing, a plurality of video storage devices 232 can be used. Also alternatively or in combination with the foregoing, the microcontroller 210 can also perform the operations required to store and or retrieve video and other data in the video storage device 232.

The video processing module 216 output can be directly supplied as a video output to a viewing device such as a video or computer monitor. In addition the video and/or audio outputs can be supplied to an RF modulator 234 to produce an RF output and/or 8 vestigal side band (VSB) suitable as an input signal to a conventional television tuner. This allows the receiver 200 to operate with televisions without a video output.

Each of the satellites 108 comprises a transponder, which accepts program information from the uplink center 104, and relays this information to the subscriber 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the receiver 200 also receives and stores a program guide in a memory available to the microcontroller 210. Typically, the program guide is received in one or more data packets in the data stream from the satellite 108. The program guide can be accessed and searched by the execution of suitable operation steps implemented by the microcontroller 210 and stored in the processor ROM 238. The program guide may include data to map the channel numbers to satellite transponders and service channel identifications (SCIDs), and also provide TV program listing information to the subscriber identifying program events.

Figure 3:
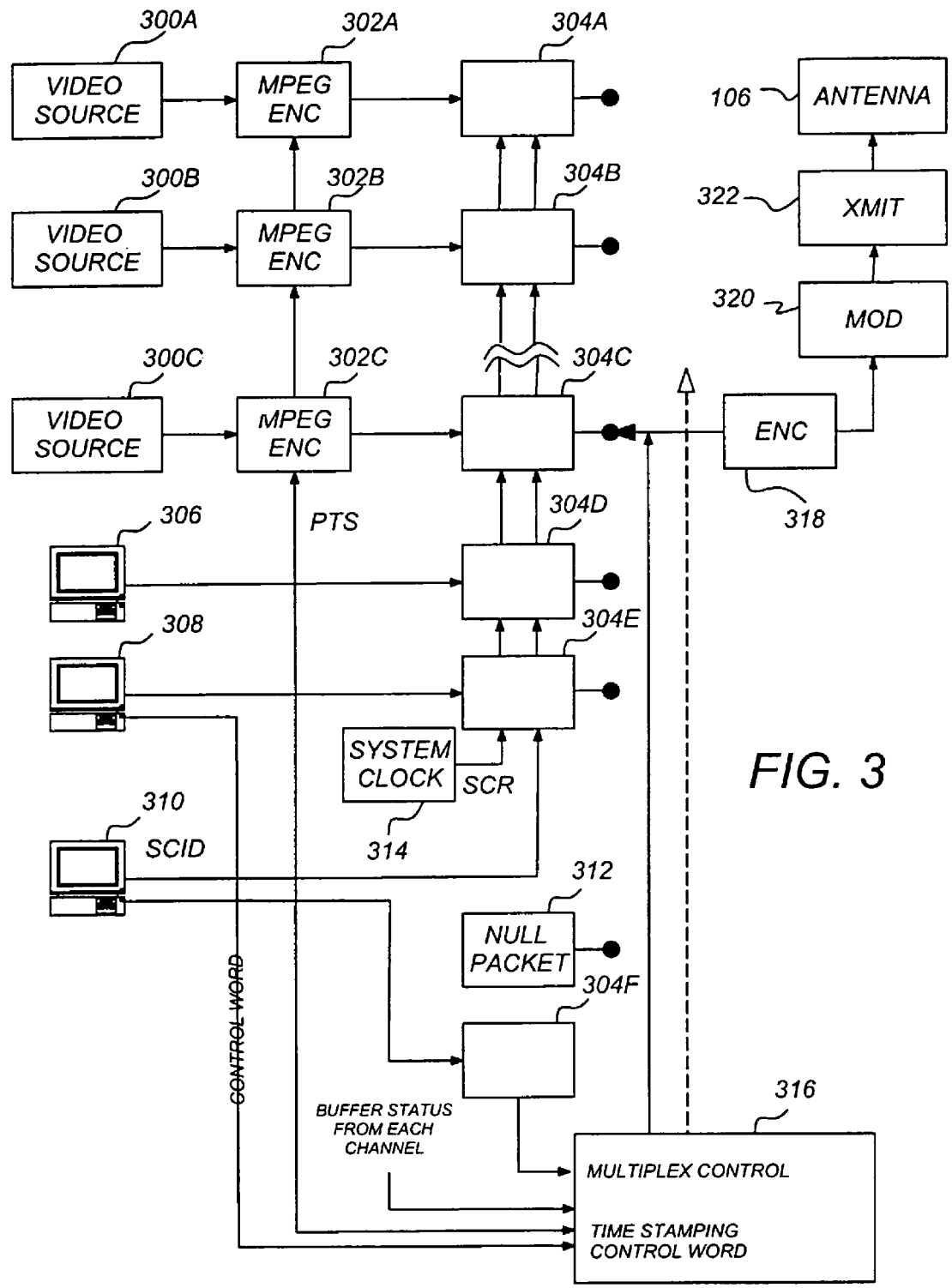
FIG. 3 is a block diagram showing a typical uplink configuration showing how video program material is uplinked to a satellite for transmission to subscribers using a single transponder.

FIG. 3 is a block diagram showing a typical uplink configuration for a single satellite 108 transponder, showing how video program material is uplinked to the satellite 108 by the control center 102 and the uplink center 104. FIG. 3 shows three video channels (which could be augmented respectively with one or more audio channels for high fidelity music, soundtrack information, or a secondary audio program for transmitting foreign languages), and a data channel from a computer data source 306.

The video channels are provided by a program source of video material 300A-300C (collectively referred to hereinafter as video source(s) 300). The data from each video program source 300 is provided to an encoder 302A-302C (collectively referred to hereinafter as encoder(s) 302). Each of the encoders accepts a program time stamp (PTS) from the controller 316. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 302 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 302, the signals are converted into data packets by a packetizer 304A-304F (collectively referred to hereinafter as packetizer(s) 304) associated with each source 300.

The data packets are assembled using a reference from the system clock 314 (SCR), and from the conditional access manager 308, which provides the SCID to the packetizers 304 for use in generating the data packets. These data packets are then multiplexed into serial data and transmitted.

FIG. 4A is a diagram of a representative data stream. The first packet segment 402 comprises information from video channel 1 (data coming from, for example, the first video program source 300A). The next packet segment 404 comprises computer data information that was obtained, for example from the computer data source 306. The next packet segment 406 comprises information from video channel 5 (from one of the video program sources 300), and the next packet segment includes information from video channel 1 (again, coming from the first video program source 300A). The data stream therefore comprises a series of packets from any one of the data sources in an order determined by the controller 316. The data stream is encrypted by the encryption module 318, modulated by the modulator 320 (typically using a QPSK modulation scheme), and provided to the transmitter 322, which broadcasts the modulated data stream on a frequency bandwidth to the satellite via the antenna 106. The receiver 200 receives these signals, and using the SCID, reassembles the packets to regenerate the program material for each of the channels. As shown in FIG. 4A, null packets created by the null packet module 312 may be inserted into the data stream as desired.

FIG. 4B is a diagram of a data packet. Each data packet (e.g. 402-416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 422 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 424 comprises 127 bytes of payload data, which is a portion of the video program provided by the video program source 300. The final packet segment 426 is data required to perform forward error correction.

Figure 5:
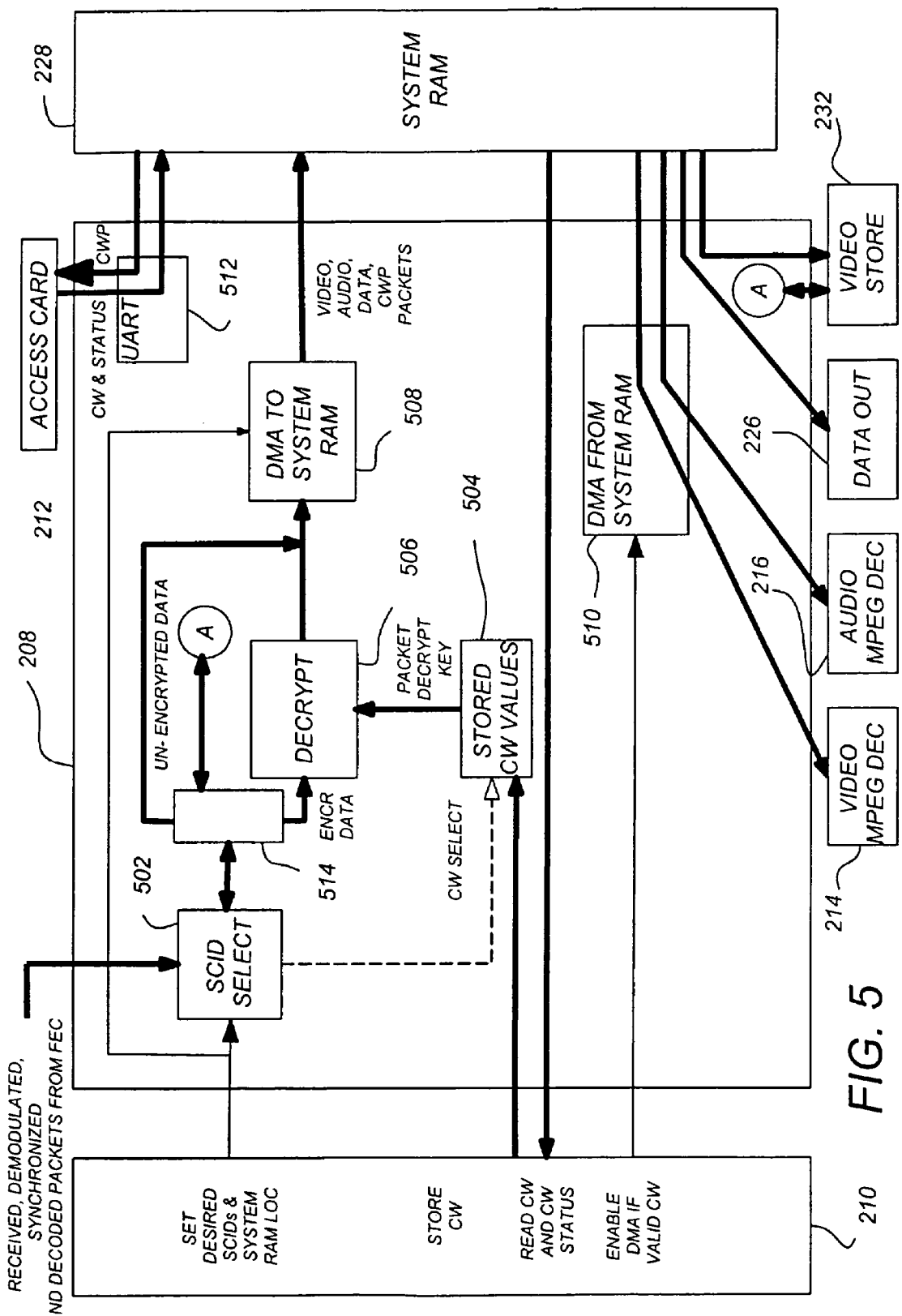
FIG. 5 is a block diagram illustrating transport module functions.

FIG. 5 is a block diagram showing additional detail regarding the operations of the transport module. The data packets which are received, demodulated, synchronized and reverse FEC coded from the FEC module 206 are provided to a demultiplexer such as the SCID select module 502. Program selection information is processed by the microcontroller 210, and used to select the one or more SCIDs associated with the desired program (a program may be separated into several streams, each with an associated SCID). As set forth more fully herein, program selection can include a selection for ordinary viewing, or for VOD recording. In addition, the selection of a program for VOD recording can be accomplished by the subscriber, according to an express selection, a result of a processing routine to predict the subscribers preferences from a viewing history, or by selection by the control center 102.

The SCID select module compares the selected SCID or SCIDs with the SCIDs for the incoming packets, and passes those packets with SCIDs matching the selected channel(s). For single channel service, non-selected packets (packets without the subscriber-selected SCID) are simply discarded.

In the typical case where a video program comprises multiple stream elements, the SCID select module passes the required packets. If more than one channel is desired (e.g. to allow the reception and recording multiple channels at a time while simultaneously viewing them) the SCID select module 502 passes these the stream elements for the additional channels as well.

In the preferred embodiment, all program material is encrypted. For viewing encrypted programming, the receiver 200 is responsible for verifying that access should be granted, and if so, decrypting the data packets so the program material can be viewed by the subscriber. For unencrypted programming, the data router 514 directs the data packets directly in the system RAM 228 via DMA 508.

To provide program information for use in the distribution and viewing of PPV program material, the control center 102 transmits (via the uplink center 104 and the satellite 108) a purchase information packet (PIP) that is associated with PPV program materials described in the program information guide. When the subscriber wants to view PPV program material, the receiver 200 is used to select the corresponding PPV program material. The receiver obtains a PIP pointer, and tunes to a transponder that carries the PIP. A PIP pointer is a numerical value that is stored with a program in the program guide stream or functionally computed from a program's channel and start time (e.g. PIP pointer=program.PIP_pointer, or PIP pointer=f(channel, start time)). The PIP is received by the receiver 200 by acquiring the PIP for the send PIP pointer, and provided to the access card 212, which checks the PIP for purchasability (e.g. blackouts, rating, credit balance, etc.).

Each data packet is associated with a control word packet (CWP) that is received by the transport module 208. The CWP encodes each program to prevent tampering, and is used to generate a CW and a CW status, which are stored in the CW memory 504. The CW is used to enable data packets to be retrieved from the system RAM 228 and provided to the video MPEG decoder 214 and/or audio MPEG decoder 216, and may also be used to decrypt the data packet itself.

As set forth more fully below, the present invention also provides non-real time viewing capability to the viewer. This non-real time viewing capability includes (1) the ability to store a video program in its entirety for complete off-line viewing at a later date, and (2) the ability to "pre-store" the first portion of a video program to provide virtual VOD service. In case (2), an initial segment of the video program is recorded in advance of the user request (e.g., the first 30 minutes). When the user decides to view the video program, the "pre-stored" segment is played back, while the subsequent remaining video program segments (which are each transmitted on different channels) are recorded. These segments are spliced together to provide a virtual video on demand system that provides the appearance of true video on demand.

Programs eligible for VOD service may be indicated as such by the VOD indicator or other appropriate flag in the program guide or other data service. Eligibility may also be determined by analysis of the availability alternate program information start times and determining if the alternate program start times will support VOD service. In one embodiment, the IRD determines VOD service availability using staggered showings of the same program by use of information in the program guide. The program guide supplies the channel number and start time of all program material. The IRD can use the staggered showing information to record the program material at a rate faster than real time.

Programs that are eligible for VOD service may include encrypted PPV programs, encrypted non-PPV programs, and non-encrypted programs.

The storage of non-encrypted data segments is accomplished by passing the data through the system RAM 228 (indicated by the first switch 514 in the up position) and then to the video storage device 232, or by passing the data directly from the transport module 208.

The retrieval of non-encrypted data segments is accomplished by reading the data segments from the video storage device 232 and routing those data segments to the system RAM 228 using the data router 514 and the DMA to system RAM 508, where they can be read and provided to the MPEG decoders 214, 216.

The storage of encrypted data packets can be accomplished in one of two ways. First, the encrypted data packets can be decrypted by the decryption module 506 as described above, and passed through the system RAM 228 to the video storage device 232. This method is appropriate, for example, when the subscriber 110 is entitled to view all encrypted program material (e.g. a monthly subscription). Alternatively, the receiver 200 can store the data packets in encrypted form and decrypt them for later viewing after a purchase choice is made by the customer. In one embodiment data router 514 directs encrypted data segments directly to the video storage device 232. In another embodiment, the encrypted data is sent to the video storage device 232 via the system RAM 228.

Two levels of encryption can also be used to implement an additional layer of access control for PPV programs. A first level of access control can be used to limit access to persons who are authorized to purchase a PPV program (e.g. subscribers) and the second level of access control can be used to limit access to the PPV program to those who have actually purchased a PPV program. In this case, data packets may be decrypted to the first level of access, and stored in the video storage device 232. However, since the data packets are encrypted according to two levels of access control, the data must be read from the video storage device 232 and decrypted to the second level of access before the video data can be decoded and presented to the user.

In either case, the encrypted data packets must be decrypted before presentation to the user. This is accomplished by reading the encrypted data packets from the video storage device 232, and routing these packets to the decrypt module 506. These encrypted data packets are then decrypted and stored in the system RAM 228 for DMA access by the MPEG decoders 214, 216.

In one embodiment, the decryption process is accomplished as follows. In response to a user demand and while retrieving the stored first segment 804 for presentation to the user, a message is transmitted from the IRD 200 separately identifying each of the subsequent segments 806 of the selected video program and the user to the program source such as the control center 102 or the uplink center 104. A code or key such as the PIP is then received by the IRD 200. The key is later used to decrypt the encrypted segments so the video program can be viewed by the user.

In another embodiment, a message is transmitted to the IRD 200 separately identifying each of the subsequent segments 806 of the selected video program and the user to the program source such as the control center 102 or the uplink center 104. In response, a plurality of codes or keys are transmitted and received by the IRD 200, and each of the keys is used to decrypt an associated one of the encrypted subsequent segments 806.

Figure 6:
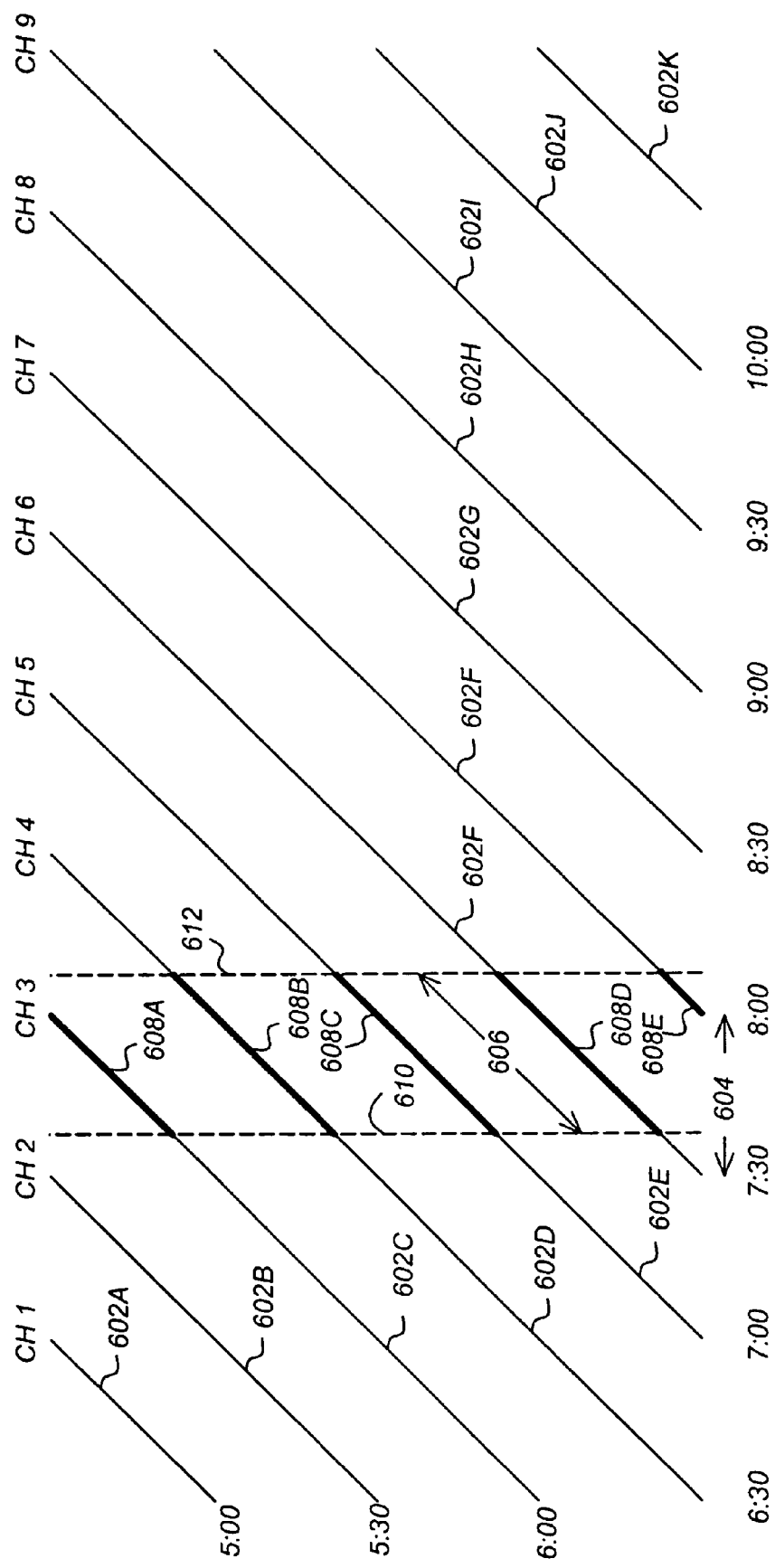
FIG. 6 is a diagram illustrating the transmission of a video program to provide near video on demand (NVOD) service.

FIG. 6 is a diagram illustrating the transmission of a video program to provide near video on demand (NVOD service). NVOD service is accomplished by broadcasting the same video program 602 on a plurality of program channels with each channel temporally separated by a rebroadcast interval 604. As shown in FIG. 6, the video program can be broadcast at 5:00 on channel 1 (using the appropriate SCID), 5:30 on channel 2, 6:30 on channel 3, and so on. Using this broadcast technique, the video program can be viewed from the beginning to the end, without requiring the user to wait for more than 30 minutes (hence, providing near video on demand). As shown in FIG. 6, this means that at any particular time, during an time interval 606, different time segments of the video program 608A-608E (hereinafter referred to collectively as segments 608) are broadcast in parallel, and can be received by the receiver 200.

Figure 7A:
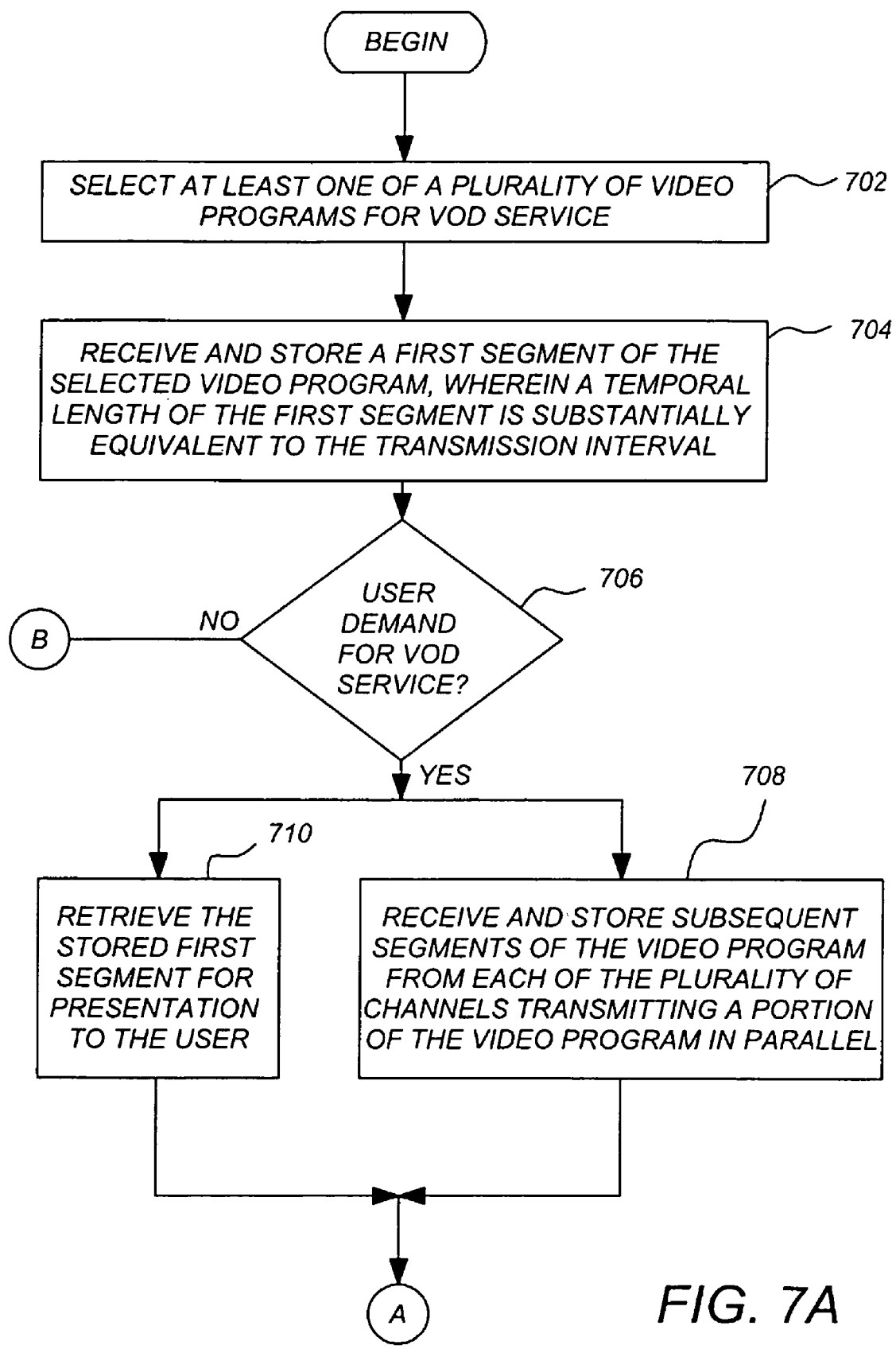
FIGS. 7A and 7B are flow charts presenting exemplary method steps used to practice one embodiment of the present invention.
Figure 7B:
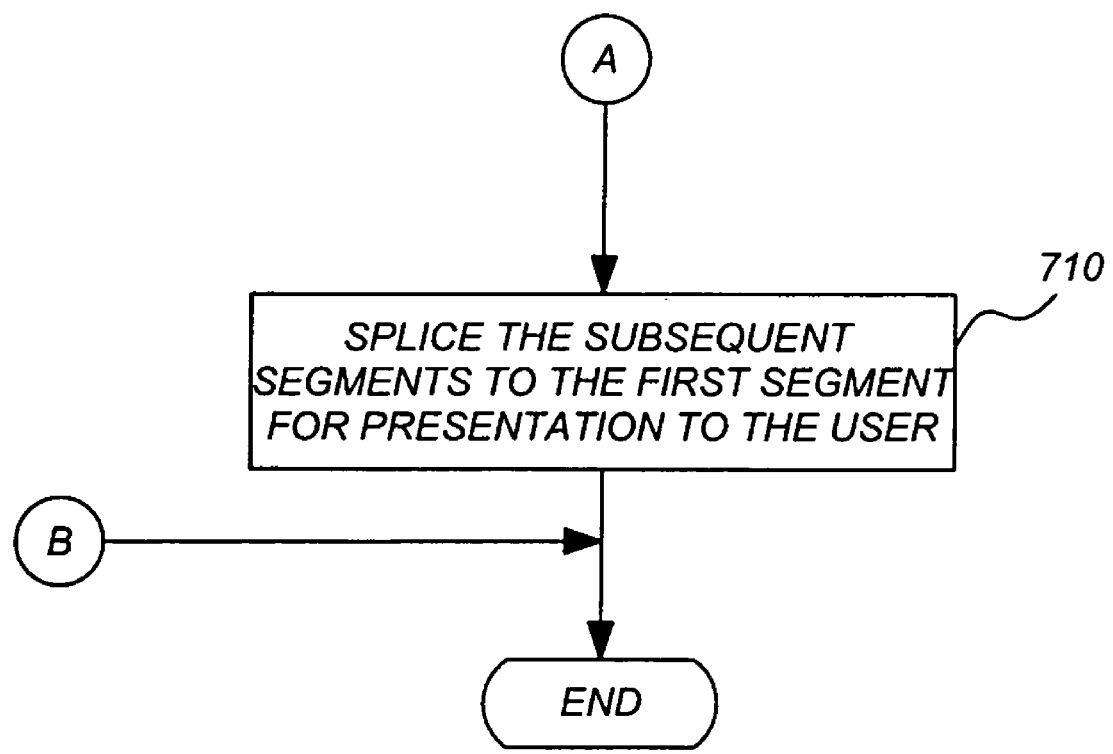

FIGS. 7A and 7B describe a flow chart presenting exemplary method steps used to practice one embodiment of the present invention. First, as shown in FIG. 7A, at least one of a plurality of video programs is selected 702 for video service. The point in time at which the plurality of video programs was selected for VOD service is indicated as $t_s$ 802. A first segment of the selected video program is then received and stored. This is illustrated in block 704 of FIG. 7A and by the "pre-store" interval 804 extending from time $t_{p1}$ to time $t_{p2}$ in FIG. 8A. Typically, the time length of the pre-stored video program material segment 804 is equal to the rebroadcast interval $t_R$ 604. This allows all of the subsequent time segments 806A-806D (collectively referred to hereinafter as subsequent time segment(s) 806) of the video program to be recorded while the pre-stored video program segment 804 is played back for viewing. However, the length of the pre-stored video program material segment can be greater than the rebroadcast interval 604, to provide additional video program material for use in splicing the subsequent segments 806 to the pre-stored segment 804, or to provide additional time for the splicing process to be completed.

Returning to FIG. 7A, when the user requests 706 VOD service, the pre-stored segment 804 is retrieved for presentation to the subscriber 110. While this retrieval is taking place, the subsequent segments 806 of the video program material are being received from some of the plurality of channels (channels 3, 4, 5, and 6 in FIG. 8A, for example) are received and stored in the video storage device 232. The foregoing operations occur in parallel so that the data from all of the relevant channels can be received and stored while retrieving the stored first segment for presentation to the subscriber 110. If necessary, this can be implemented with separate disk drives or memories for faster processing.

Figure 8A:
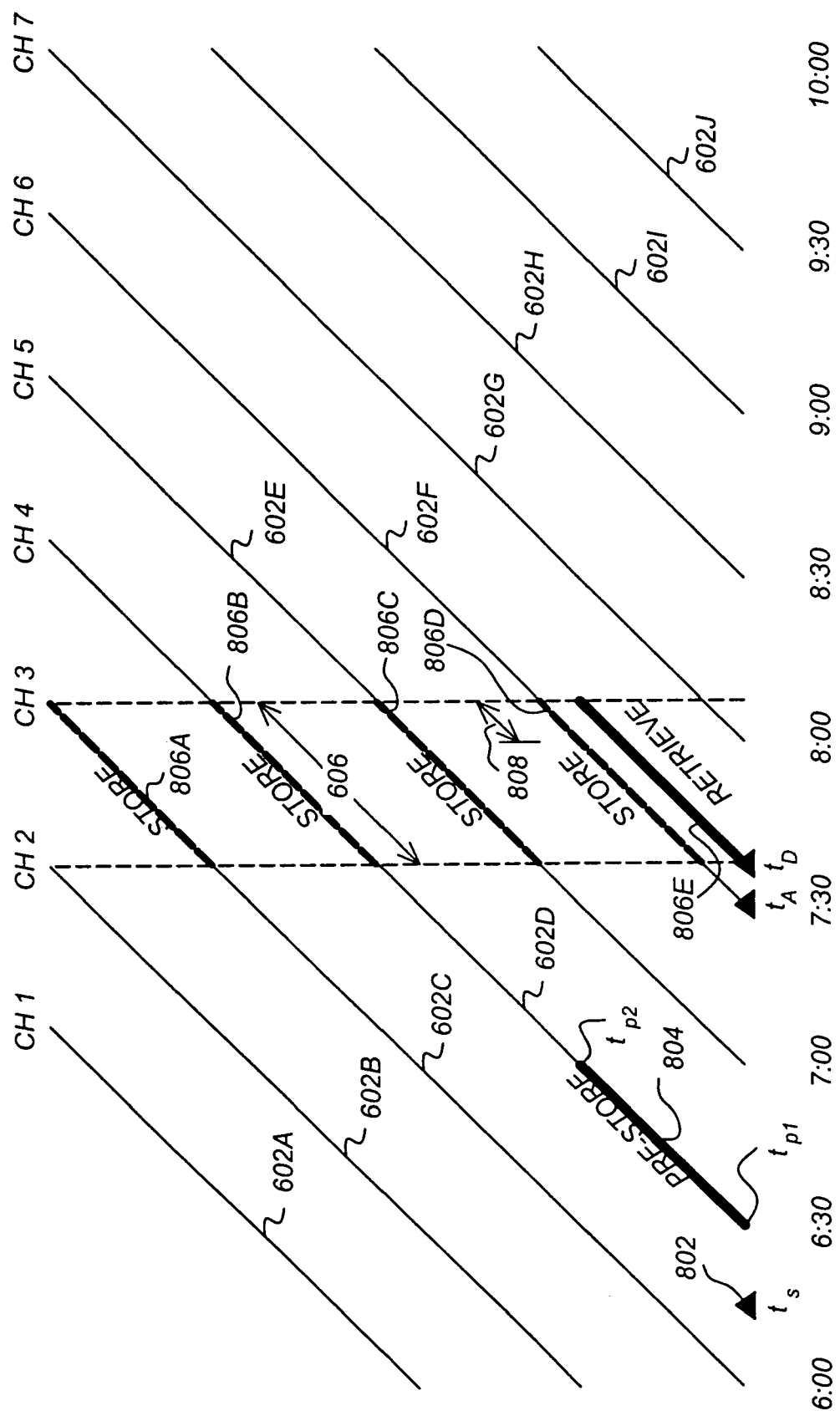
FIG. 8A is a diagram illustrating aspects of the operation of the present invention.

As shown in FIG. 8A, depending on the time the subscriber demands VOD service $t_D$, data present on some of the channels need not be recorded. For example, given the demand time $t_D$ shown in FIG. 8A, the first portion of the program information on channel 6 need not be recorded, since it is duplicative of the information in the pre-stored segment 804 being retrieved from the storage device 232. Instead, the only program information that must be recorded is the last $t_R-(t_D-t_A)$ portion of the video segment, wherein $t_A$ is the commencement time for the most recent broadcast of the program, and $t_R$ is the rebroadcast interval. The interval of the subsequent video program segment 806D that must be recorded is shown as interval 808. The remainder of the interval of the subsequent video program segment 806 need not be recorded, and the bandwidth normally used for receiving and storing this information can be directed to other purposes (e.g. storing other program material for VOD service).

Turning to FIG. 7B, the subsequent segments 806 are spliced to the pre-stored segment 804 using the techniques set forth herein. In one embodiment, the splicing of segments is prioritized according to point in the video program currently selected by the user. If the user is viewing the video program from start to end, without interruption, fast forward, or rewind, the end of the pre-stored segment 804 is spliced to the beginning of subsequent segment 806D first, and then the beginning of each subsequent segment is spliced to the end of the preceding subsequent segment (hence, after splicing, the order of the segments is pre-stored segment 804, subsequent segment 806D, subsequent segment 806C, etc.).

In one embodiment of the present invention, the user cannot fast forward past the pre-cached segment 804 until the immediately following segment (i.e. segment 806D) has been recorded. Hence, the VOD system allows an asynchronous start of viewing, but truly random access to all program material is only available after all of the program segments 806A-806D have been recorded.

However, since the multi-channel reception and storage described herein permits the remainder of the program material to be downloaded rapidly, another embodiment of the present invention permits the subscriber 110 to fast forward and rewind while viewing the retrieved pre-stored segment 804 and storing the subsequent segments 806. In such cases, different splicing techniques are implemented. For example, if the user is in the middle of viewing the pre-stored segment 804 and issues a command to fast forward the program to a time near the beginning of the last subsequent segment of the program 806A, the splicing of subsequent segment 806B to subsequent segment 806A will be granted a higher priority than the splicing of pre-stored segment 804 to the first subsequent segment 806D. It should also be noted that to further improve performance, data from the end of the pre-stored segment 804 may be retrieved in parallel with other data being retrieved from the pre-stored segment 804 for subscriber viewing to allow essentially "pre-splice" the end of the pre-stored segment 804 to the beginning of the (recently received) subsequent segment 806D.

It should also be noted that the splicing between the pre-stored segment 804 the first subsequent segment 806D can be performed at different times, which can be advantageously chosen to minimize the splicing time or to maximize fast-forward and rewinding capability.

Figure 8B:
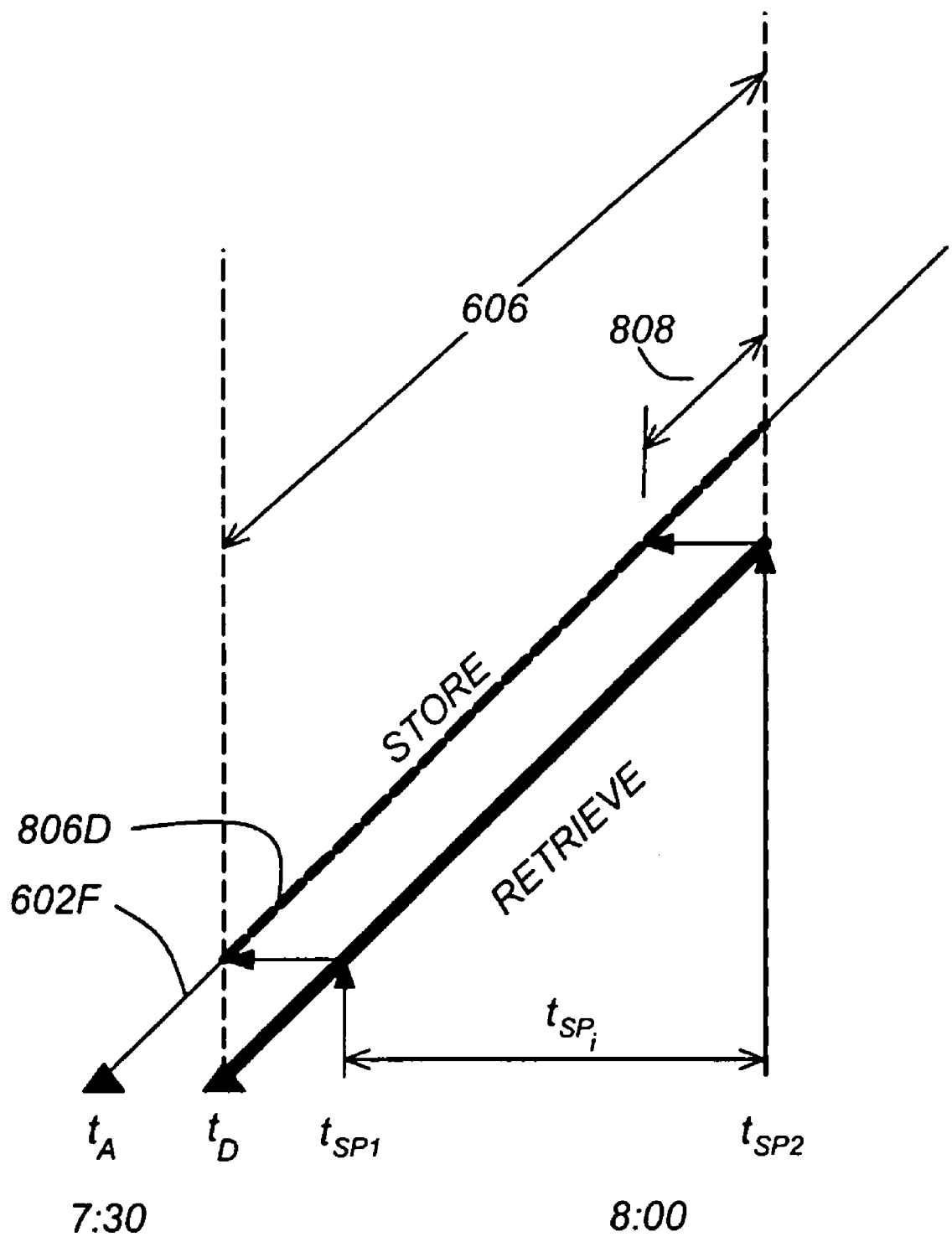
FIG. 8B is a diagram showing additional detail regarding the splicing of program material.

FIG. 8B is a diagram illustrating the different times that the pre-stored segment 804 may be spliced to the first subsequent segment 806D. By inspection, the first time at which a splice may be performed between pre-stored segment 804 and the subsequent segment 806D is a time $t_{SP1}$, and the last time a splice may be performed is at time $t_{SP2}$. The actual splicing time can be determined according to a number of user input or program parameters. For example, the selection of a splice time of $t_{SP2}$ permits the user to fast-forward, reverse, and pause anywhere within the pre-stored segment 804 at will with minimum program interruption. Conversely, the selection of splice time $t_{SP2}$ minimizes memory requirements, as less program material need be stored to provide VOD service. Conversely, if the splice time $t_{SP1}$ is selected, segment 806D need not be stored at all, as the pre-stored segment 804 may be spliced to the broadcast program material as soon as practicable. This effectively minimizes memory and throughput requirements. Further, if time segment information is provided in the program material, fast forward and reverse operations may be implemented by splicing back to pre-stored segment 804 program material as required.

Figure 8C:
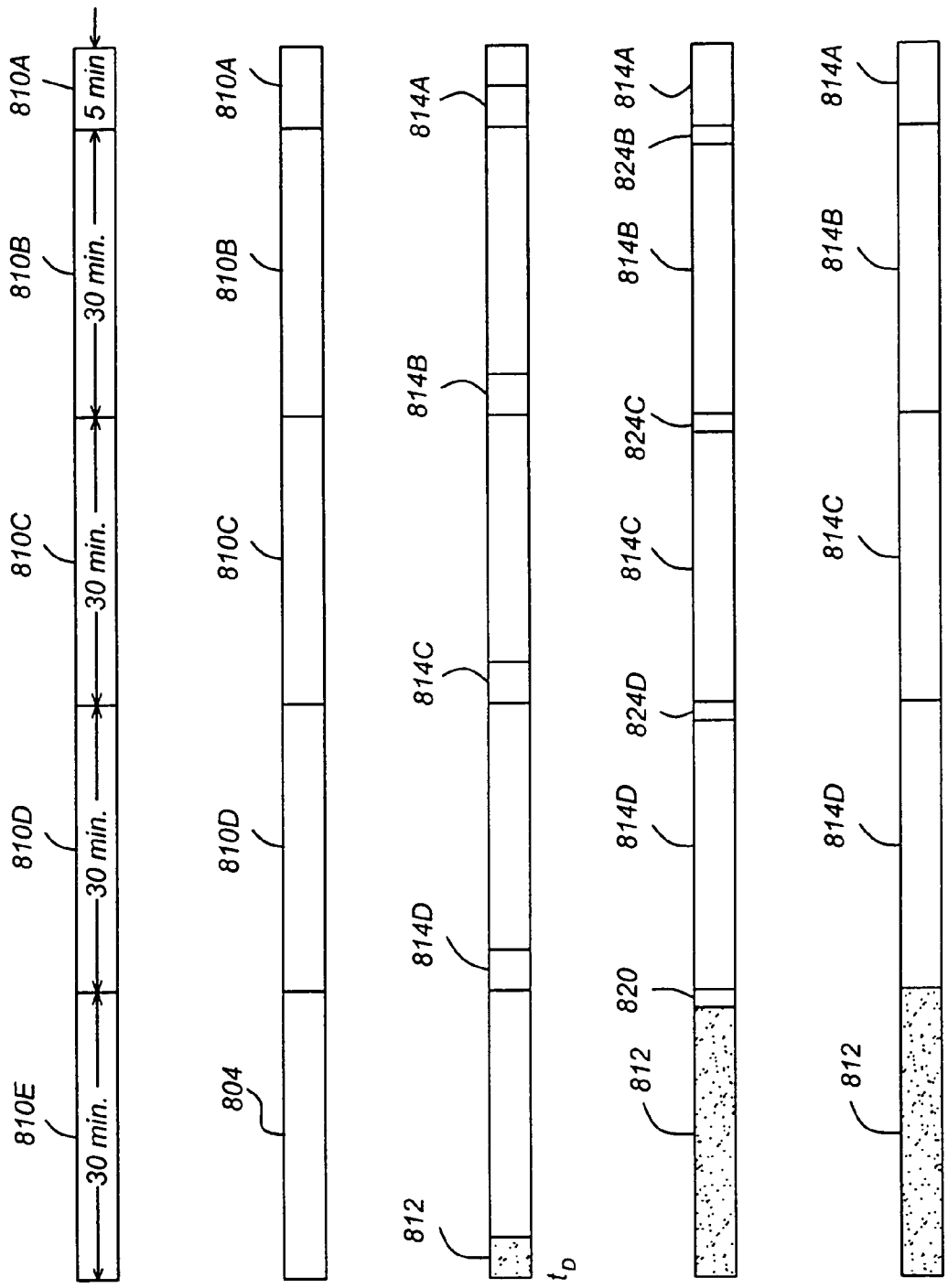
FIG. 8C is a diagram showing additional detail regarding caching of program material.

FIG. 8C is a diagram showing additional detail regarding the caching and splicing of program material. In the illustrated case, a program "A" is 125 minutes long, and the rebroadcast interval is 125 minutes. Hence, the program includes four thirty-minute segments 810B-8110E and a five-minute segment 810A. The IRD 200 pre-stores a first segment 804 having 30 minutes of program material in anticipation of a customer's desire to view program "A." This can occur, for example in the interval between 6:30 and 7:00 as depicted in FIG. 8A. The PIP is also pre-stored or cached if the program is a PPV program. Audio tracks can be recorded along with the video information. These audio tracks can include all audio tracks, or only one or more preferred audio tracks (i.e. audio tracks corresponding to a particular language or program rating).

After the customer requests viewing of the program material at time $t_D$, the IRD 200 begins playing back the pre-recorded segment 804, and searches the program guide for staggered showings of program "A". The IRD 200 then begins to record the available program segments 810A-810D from the staggered showings of program "A" while playing back the prerecorded segment 804. After an amount of time elapses, a viewed portion 812 $t_V$ of the pre-recorded segment 804 has been played back and portions 814A-814D of the remaining segments 810A-810D are recorded. As time passes, the viewed portion 812 $t_V$ gets larger, as do the recorded portions 814A-814D or the remaining segments 810A-810D. For example, in the fourth illustration from the top of FIG. 8C, twenty-nine minutes of the prerecorded interval 812 have been played back, with 1 minute of anticipated pre-recorded storage material 820 remaining, and the IRD has completed caching 29 minutes of each 30 minute program segment, as illustrated in elements 814A-814D. A total of three minutes of program material remains to be recorded (one minute from each of the program segments). These remaining portions are illustrated in FIG. 8C as 824B-824D. By the time the end of the pre-recorded segment 804 is reached, all of the remaining segments 810A-810D have been recorded. At this time, the program material at the end of segment 812 is spliced to the program material beginning at 814D. Similarly, the program material at the beginning of each segment 814A-814C is spliced to the end of the program material of the preceding program segment. In one embodiment, the program material at the end of the pre-recorded segment 812 is spliced to the program material in the following program segment 814D before the playback of the pre-recorded segment 812 is completed. Since the material at the beginning of the following program segment 814D is available soon after the viewer begins playing back the pre-recorded segment, the information required to perform the necessary splicing operations is available before all of the program material in the prerecorded segment 812 has been played back, and before all of the program material of the following segment 814D has been recorded. Hence, the segments may be pre-spliced if necessary.

In a preferred embodiment of the present invention, the IRD 200 includes a single tuner/demodulator 204 and associated circuitry which can receive and decode all the necessary channels for VOD service (e.g. channels 3-6 in FIG. 8A) from the same frequency band, and is able to simultaneously acquire and handle bandwidth from Z program streams wherein Z is defined as:

$$Z = \operatorname{ceiling}\left(\frac{X}{t_R}\right)$$

wherein X is the duration of the program in minutes, and $t_R$ is the amount of pre-cached material in minutes. Hence, in the foregoing example, $$Z = \operatorname{ceiling}\left(\frac{125}{30}\right) = \operatorname{ceiling}(4.1667) = 5.$$

When one segment is pre-cached, the IRD 200 need only cache the remaining segments. Thus, in this case, $$Z = \operatorname{ceiling}\left(\frac{X}{t_R}\right) - 1$$

If an IRD 200 with a single tuner/demodulator 204 cannot accommodate the simultaneous reception and storage of Z program streams, then the IRD 200 may not be able to cache the entire program in the time it takes to play back the initially cached program segment. In this case, the single tuner IRD 200 may give precedence to the earliest segments (e.g. 806D and perhaps 806C) and later record the remaining, yet unrecorded program segments (e.g. segments 806B and 806A).

Alternate embodiments using IRDs 200 with two or more tuner/demodulators 204 are possible as well. Generally, IRDs 200 with multiple tuners (n-tuner IRDs 200) can be used to receive staggered shows on n-frequency bands. For example, the time-staggered video programs may be broadcast on two frequency bands, and received by an IRD 200 having two tuner/demodulators 204, one tuner/demodulator 204 for receiving signals on each of the two frequency bands. Further, it is possible to broadcast m time-staggered video programs on n frequency bands. In this embodiment, IRDs 200 with single tuner/demodulator 204 can receive a subset of the m video programs (the time-staggered video programs broadcast on one of the n frequency bands), while IRDs 200 with multiple tuner/demodulators 204 can receive additional video programs as well.

Hence, 2-tuner or more (n-tuner) IRDs 200 can be used to eliminate the limitation on the broadcaster for all staggered start time transmissions of a program to be all on the same frequency.

N-tuner IRDs 200 can also be used to reduce storage requirements as well. Since the N-tuner IRD can be used to receive more information in a given amount of time, the IRD 200 need pre-store much less information, allowing the user to pre-store data for more video programs in the video store 232. For example, an IRD 200 with a single tuner/demodulator 204 can be used to receive the channels 2-6 shown in FIG. 8A. An IRD 200 with two tuner/demodulators 204 can be used to receive additional material broadcast on a channel 3A (staggered in time from channel 3 by 15 minutes), channel 4A (staggered in time from channel 4 by 15 minutes), and channel 5A (staggered in time from channel 5 by 15 minutes). For such an IRD 200, the rebroadcast interval is effectively reduced to 15 minutes, and the IRD 200 need only pre-store 15 minutes worth of program material (allowing either more pre-cached program material or relaxed storage requirements), instead of the 30 minutes of program material required by the single-tuner/demodulator 204 IRD 200. Advantageously, this additional capability does not render the single tuner/demodulator 204 IRD 200 obsolete. As can be seen from the foregoing, additional IRD 200 video store 232 memory permits a reduced rebroadcast interval as well. The foregoing can also be used to download and cache the entire program more quickly, thus allowing random program access (through fast-forward and reverse operations, for example) more rapidly.

Several alternatives are available to splice MPEG-coded data together. If the splices are infrequent (i.e. at the start of the video program), the data stream can be abruptly switched from the pre-stored video program segment 804 to the next subsequent video program segment 806D. In this case, the MPEG decoders 214 216 will have to reacquire lock on the program material. This may result in a disruption in the program material of at least 1 group of pictures (GOP) in length, which would appear similar to a change of channel.

In another embodiment of the present invention, dual MPEG decoder pairs 214 and 216 (two video MPEG decoders 214 and two audio MPEG decoders 216) are used. This can be implemented with a transport module 208 and MPEG decoder pair 214, 216 for the current segment, and a second transport module and second MPEG decoder pair for a next subsequent segment 806D. When the end of the pre-stored video program segment 804 is reached, the video signal from the output of the first MPEG decoder 214 is simply switched to the second MPEG decoder, eliminating the disruption described above. The foregoing can also be implemented with a single transport module, but dual MPEG decoders 214, 216 as well. As described above, the length of the pre-stored video program segment can be increased beyond the rebroadcast interval 604 so that the foregoing splicing problems can be ameliorated. Similarly, the recording interval of each of the subsequent video program segments 608 can be increased beyond the retransmission interval to promote clean splicing from one of the subsequent segments to the next. Another method of MPEG splicing interleaves or otherwise associates each of the video segments 804, 806 with a time code such as the SMPTE standard 312M time code. This time code can then be used to reassemble and splice together the video segments 804, 806. The proposed SMPTE standard 312M time code is described in the October 1998 issue of the SMPTE Journal, which is hereby incorporated by reference herein.

In addition to the foregoing MPEG splicing, there is also the issue of sub-segment management. Sub-segment management addresses the difficulty posed by the possibility that data packets (e.g. packets 402-416) will arrive at the transport module 208 (and hence, the demultiplexing element 502) in sequence, but in uncertain time intervals. Each sub-segment, which may comprise one or more packets, must be reassembled to produce the program material.

Each sub-segment can be assembled by sorting by a channel identifier (such as the SCID), and the sorting the assembled sub-segments in accordance with a time code. The SMPTE time code, which is usually defined in terms of hours, minutes, and seconds of the program as HH.MM.SS, can be used for this purpose. Alternatively or in combination with the foregoing, a recirculating program time stamp (PTS) value described above can be used for the time stamp. To splice segments together, the last I frame of a previous segment is spliced with the first I frame of a subsequent segment. Since the PTS provides an indication of the program time, it can be used to match the I frames so that the segments may be properly spliced together. Since the PTS is a wrap-around binary counter, ambiguities may be encountered. If necessary, a time-of-day clock can be used in conjunction with the PTS to eliminate the ambiguities caused by the wrap-around characteristic.

As described above, the present invention permits the user to select at least one of a plurality of video programs and to receive a plurality of time segments of the video program in parallel, wherein each of the time segments is received on a different one of the channels. The present invention also permits the selection of a second video program for real time reception and receiving the selected second video program in real time while receiving the plurality of time segments of the selected at least one of a plurality of video programs in parallel.

Figure 9:
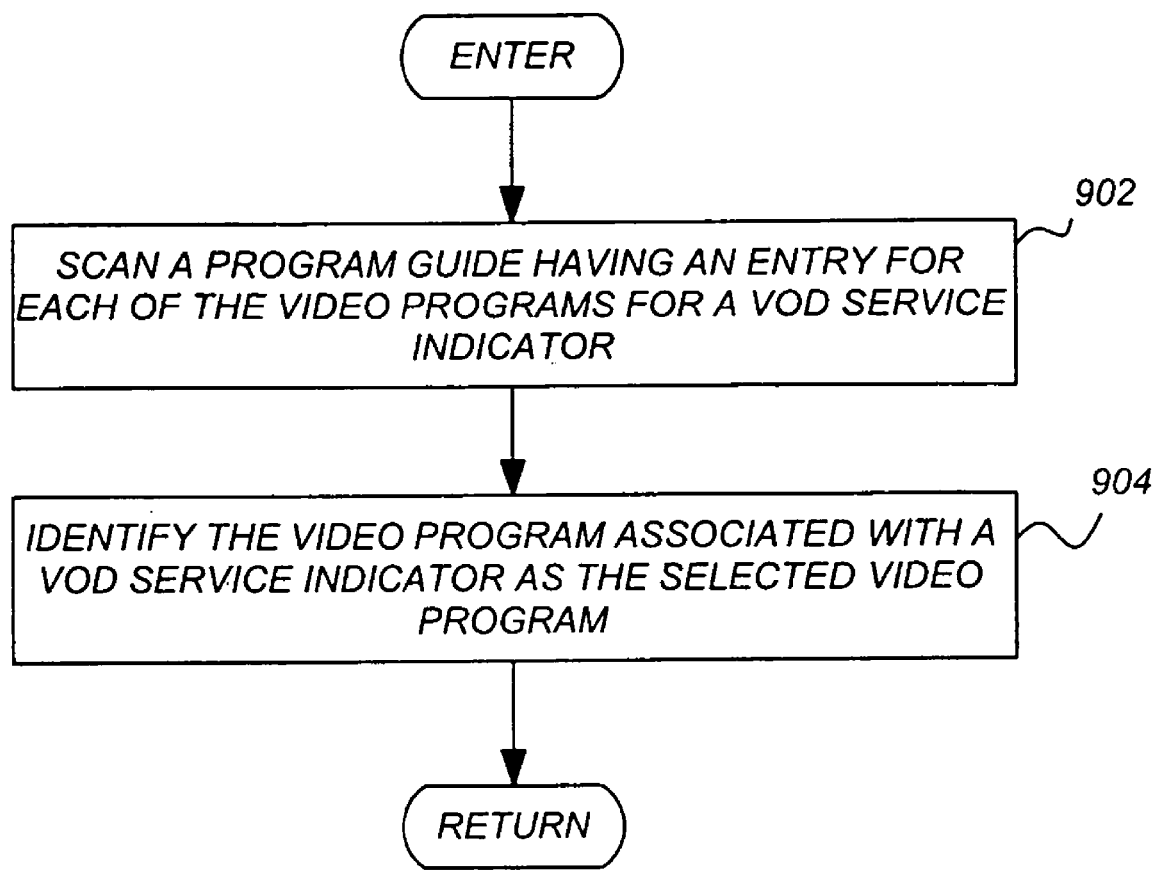
FIG. 9 is a flow chart illustrating exemplary operations used to select at least one of the plurality of video programs for VOD service.

FIG. 9 is a flow chart illustrating exemplary program steps used to select at least one of the plurality of video programs for VOD service. As described earlier herein, the receiver 200 stores a program guide which presents a description of the video programs available for viewing now and for a period of time in the future to the viewer. Each of the video programs includes a SCID, which identifies that program. By selecting the SCID, the receiver is set to retrieve the video program segments associated with the SCID for viewing. An indicator such as a flag, a bit or word can be associated with each video program in the program guide for which VOD services are desired. In one embodiment, the indicator may be placed in the program guide by the control center 102 before the program guide is downloaded in the receiver 200, either through the PSTN link 120 or the downlink 118. The program guide is then scanned 902 to find the VOD service indicator. Video programs associated with a VOD service indicator are then identified as programs to be recorded for VOD service, as shown in block 904.

The indicators may also be placed, removed, or altered by the subscriber 110 using the keyboard or remote control 224 while viewing the program guide (essentially scanning through the guide and using an appropriate input to designate the program as a VOD program). In one embodiment, the video program provider provides baseline VOD service designations, but the user can elect to do so as well, with the user's selections given priority in the situation where there is inadequate time and/or bandwidth to pre-store all video segments that have been defined. It is also possible for a program provider VOD selection download to be interrupted by a user-selected VOD selection, and completed when the channels are available to do so. The program guide can also include information to augment the designation of a program for VOD service. For example, data can be associated with each program indicating when the recording of the pre-stored segment 804 should commence. This allows the video provider to efficiently schedule the storing of pre-stored segments 804 (using information that may include global knowledge of the VOD selections from each subscriber). Hence, the storage of pre-stored segments 804 can occur in the middle of the night or at some other time when there are more channels or more bandwidth available to do so. Similarly, if desired, entire movies can be transmitted over multiple channels and made available for true VOD service.

Figure 10:
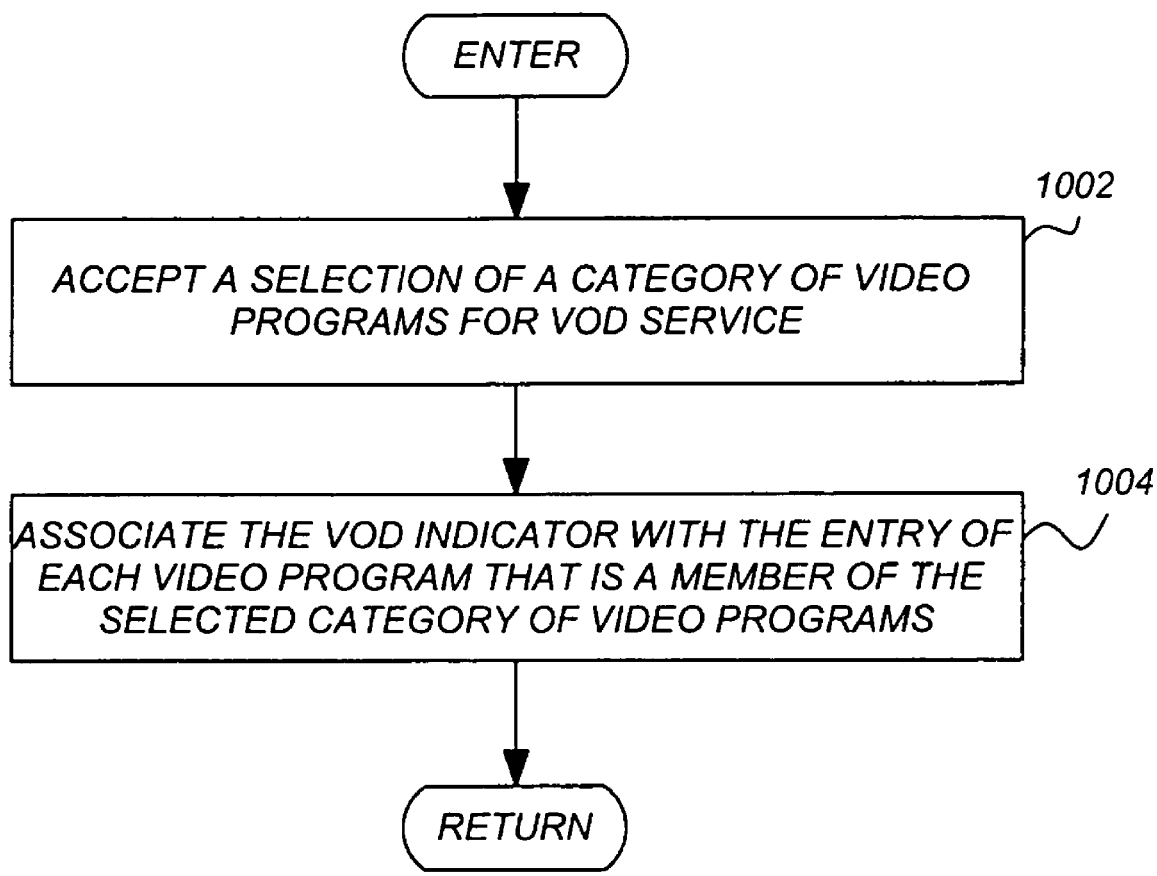
FIG. 10 is a diagram illustrating exemplary operations used to select one of the plurality of video programs for VOD service in another embodiment of the present invention.

FIG. 10 is a diagram illustrating another method of selecting one of the plurality of video programs for VOD service. Here, the subscriber has not made any express program selections for VOD service, but has instead elected to allow the receiver to do so based upon a personalized indication of which programs the subscriber may want to see. This personalized indication may be obtained from the viewing history of the user, as sensed and recorded by the receiver 200. Or, the user may indicate the genre or category of program material that the subscriber prefers. The receiver then uses this information to generate a list of programs for which the subscriber will likely want VOD service. The user may then edit this list to remove uninteresting programs, or simply allow the receiver to retain those program designations for VOD service. This can be accomplished by accepting a selection of a category of video programs for VOD service (e.g. basketball programs, drama, a particular actor or director, designation as including a secondary audio program in a different language), as shown in block 1002. After an appropriate search of program information guide information is performed, the VOD indictor previously described is associated with each video program that is a member of the user's category of video programs, as shown in block 1004.

In yet another embodiment of the present invention, the IRD 200 is capable of identifying programs that are available for VOD service without the use of a VOD service indicator. This is accomplished by scanning an electronic program guide accessible to or stored within the IRD 200 to determine instances when the same video program is scheduled to be transmitted on multiple channels at staggered starting intervals. This is accomplished by comparing video program information such as the program's title and/or other related attributes such as a unique program identifier for the programs in the program guide. When the program title of other information match and the scheduled broadcast time are staggered so as to virtual VOD service, the IRD 200 schedules multiple simultaneous recordings to record the required program material (typically, the pre-stored segment 804). This capability can be performed with or without user intervention.

As described above, the decryption of encrypted data packets requires a PIP, which, along with the CWPs, is used by the access card 212 to decrypt the data packets and to provide DMA access to the decrypted data in the system RAM. For non-real time operations, this can be accomplished in a number of ways.

In one embodiment of the present invention, the pre-stored video program segment 804 is transmitted and stored in an unencrypted form and the subsequent video program segments are transmitted and stored in an encrypted form. This allows the subscriber to store and view pre-stored video segment 804 for VOD playback without requiring the PIP, and also allows the subscriber to view at least a portion of the pre-stored video segment before requesting the remainder of the video program. Each of the subsequent video program segments 806, however require a PIP, and hence, the remainder of the video program cannot be viewed until the receiver obtains the required PIPs for the remaining segments of the video program. These PIPs can be obtained before VOD service begins, or can be obtained after the commencement of VOD service.

In one embodiment of the present invention, the retrieval of the pre-stored video program segment 804 can be interrupted (e.g. after 5 minutes) and the subscriber 110 queried as to whether they wish to purchase the remainder of the program. If the subscriber 110 so elects, the PIPs can be provided to decrypt and access the remainder of the video packets. Since each segment of the video program (806A-806D) is associated with a different PIP, information at the control center 102 can be used to determine which PIPs are required to decrypt the entire video program in sequence, and send those PIPs to the subscriber's receiver 200.

In another embodiment of the invention, all of the video segments, including the pre-stored video segment 804 and the subsequent video segments 806 are encrypted. In this case, the PIP for the first video segment must be obtained before the video segment can be decrypted and played back. In one embodiment, the PIP for the first segment is obtained after the subscriber requests VOD service. A message is presented to the user, giving the price of the VOD program, and confirming that the subscriber is requesting that service. The control center 102 then makes the PIP for the first video segment available to the receiver 200 so that the decryption can commence. The control center can also determine the PIP for the subsequent segments (either along with the PIP for the first segment or when the subsequent segments 806 are being transmitted), and provide those PIPs to the receiver so that the remaining segments can be decrypted.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, a single demultiplexing element (the SCID selection module 502) can be used to demultiplex the information on multiple video channels of interest. The foregoing invention can also be implemented with multiple demultplexing elements or with multiple transport modules 208. For example, one demultiplexing element and/or transport module 208 can be provided for each video channel to be received in parallel. This configuration substantially speeds up the demultiplexing and decrypting operations. Further, the foregoing operations can also be performed in multiple transponder embodiments in which the receiver 200 not only has a demultiplexer element or transport module 208 for each channel, but also multiple tuners 204, each for receiving a signal on one of a plurality of transponders providing program material via downlink from the satellite 108.

It is also possible to select the length of the pre-store interval 804 to be less than the rebroadcast interval 604. In this embodiment, virtual video on demand service cannot be provided to the subscriber 110 for any random start time $t_D$.

However, this method can be used to improve the near video on demand service (NVOD) to effectively reduce the rebroadcast interval 604. For example, suppose that the actual rebroadcast interval 604 for the video program material is 30 minutes. If only 15 minutes of the program is pre-stored, true video on demand service for any random start time $t_D$ cannot be provided, since all of the remaining segments cannot be recorded before the 15 minute pre-stored interval expires. However, if the subscriber is constrained to begin replaying the stored material in the last 15 minutes of the rebroadcast interval, the pre-stored information can be played back while the remainder of the program material segments is stored, without loss of the program material. Hence, the pre-recorded segment can be used to effectively reduce the latency in the NVOD service by 100%.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of storing a video program in response to a user demand, wherein the video program is repeatedly transmitted on one of a plurality of channels, each repeated transmission separated in time from a preceding transmission of the video program by a retransmission interval and being transmitted on a different channel than the previous transmission, the method comprising the steps of:

selecting at least one of a plurality of video programs; and receiving a plurality of time segments of the selected video program in parallel, wherein each of the time segments is received on a different one of the channels.

2. The method of claim 1, wherein the time segments of the selected video program are staggered in time by the retransmission interval.

3. The method of claim 1, further comprising the step of:

selecting a second video program for real time reception; and receiving the selected second video program in real time while receiving the plurality of time segments of the selected at least one of a plurality of video programs in parallel.

4. An apparatus for storing a video program in response to a user demand, wherein the video program is repeatedly transmitted on one of a plurality of channels, each repeated transmission separated in time from a preceding transmission of the video program by a retransmission interval and being transmitted on a different channel than the previous transmission, the apparatus comprising:

means for selecting at least one of a plurality of video programs; and means for receiving a plurality of time segments of the selected video program in parallel, wherein each of the time segments is received on a different one of the channels.

5. The apparatus of claim 4, wherein the time segments of the selected video program are staggered in time by the transmission interval.

6. The apparatus of claim 4, further comprising:

means for selecting a second video program for real time reception; and means for receiving the selected second video program in real time while receiving the plurality of time segments of the selected video program in parallel.

7. An apparatus for providing a video program in response to a user demand, wherein the video program is repeatedly transmitted on one of a plurality of channels, each repeated transmission temporally separated from a previous transmission by a retransmission interval and being transmitted on a different channel than the previous transmission, the apparatus comprising:
- an input device for accepting a selection of at least one of a plurality of video programs for VOD service;
- a tuner for receiving multiple segments of the selected video program in parallel, wherein each segment is received on one of the plurality of channels; and
- a storage device, for pre-storing a first segment of the selected video program, and for storing subsequent segments of the selected video program in parallel while retrieving the pre-stored first segment of the selected video program.

8. The apparatus of claim 7, further comprising:
- a memory for storing a program guide having an entry for each of the video programs; and
- a processor, coupled to the input device and the tuner, and the memory, for scanning the program guide for a VOD service indicator, and for identifying the video program associated with the VOD service indicator as the selected video program.

9. An apparatus for providing a video program transmitted in time segments on a plurality of channels in response to a user demand, comprising:
- an input device for accepting a selection of at least one of a plurality of video programs for VOD service;
- a tuner for receiving time segments of the selected video program in parallel, wherein each segment is received on one of the plurality of channels; and
- a storage device, for storing the time segments of the selected video program in parallel wherein each of the time segments is received on a different one of the channels.

10. The apparatus of claim 9, wherein the time segments of the selected video program are staggered in time by the retransmission interval.

11. A method of pre-storing a video program to be later provided in response to a user demand, wherein the video program is repeatedly transmitted on one of a plurality of channels, each repeated transmission temporally separated from a previous transmission by a retransmission interval and being transmitted on a different channel than the previous transmission, the method comprising the steps of:
- receiving and storing a first segment of a selected video program in a local storage device before accepting a user to view the video program, wherein a temporal length of the first segment is substantially equivalent to the retransmission interval; and
- wherein portions of the first segment are received and stored on the plurality of channels in parallel.

12. The method of claim 11, wherein the selected video program is selected by performing steps comprising the steps of:
- scanning a program guide having an entry for each of the video programs for a VOD service indicator; and
- identifying a video program associated with the VOD service indicator as the selected video program.

13. The method of claim 11, wherein the selected video program is selected by performing steps comprising the steps of:
- accepting a selection of at least one of the video programs for VOD service; and
- associating the VOD indicator with the entry of each video program selected for VOD service.

14. The method of claim 11, wherein the selected video program is selected by performing steps comprising the steps of:
- scanning a program guide having an entry for each of the video programs to identify at least one video program scheduled to be repeatedly transmitted on one of the plurality of channels, each repeated transmission temporally separated from the previous transmission by a retransmission interval and being transmitted on a different channel than the previous transmission; and
- selecting the identified video program as the selected video program.

15. The method of claim 14, wherein the step of scanning the program guide comprises the step of comparing the video program information for each of the entries, wherein the video program information comprises a program title.

16. The method of claim 14, wherein the step of scanning the program guide comprises the step of comparing the video program information for each of the entries, wherein the video program information comprises a unique program identifier.

* * * * *